US009619963B2

(12) United States Patent
Elias et al.

(10) Patent No.: US 9,619,963 B2
(45) Date of Patent: Apr. 11, 2017

(54) METHODS AND SYSTEMS FOR FACILITATING A GAME WHICH ALLOWS A PLAYER TO SELECT AVAILABLE WAGERING OPPORTUNITIES

(71) Applicant: Gamesys Ltd., London (GB)

(72) Inventors: Hans Elias, Hertfordshire (GB); Robert George Thurston, East Sussex (GB); Thomas David James Aicken, London (GB)

(73) Assignee: Gamesys, Ltd., London (GB)

( * ) Notice: Subject to any disclaimer, the term of this patent is extended or adjusted under 35 U.S.C. 154(b) by 0 days.

(21) Appl. No.: 14/574,364

(22) Filed: Dec. 17, 2014

(65) Prior Publication Data

US 2015/0262450 A1 Sep. 17, 2015

Related U.S. Application Data

(63) Continuation of application No. PCT/IB2014/059688, filed on Mar. 12, 2014.

(Continued)

(51) Int. Cl.
*A63F 13/00* (2014.01)
*G07F 17/32* (2006.01)

(52) U.S. Cl.
CPC ...... *G07F 17/3225* (2013.01); *G07F 17/3244* (2013.01); *G07F 17/3262* (2013.01)

(58) Field of Classification Search
None
See application file for complete search history.

(56) References Cited

U.S. PATENT DOCUMENTS

2002/0022509 A1* 2/2002 Nicastro, II ............ G07F 17/32 463/15
2005/0059476 A1* 3/2005 Vancura .................. G07F 17/32 463/20

(Continued)

FOREIGN PATENT DOCUMENTS

EP 1180754 2/2002
WO WO2014025943 2/2014
WO WO2014141099 9/2014

OTHER PUBLICATIONS

Written Opinion for Application No. PCT/IB2014/059688 dated Aug. 5, 2014; 6 pps.

(Continued)

*Primary Examiner* — Jason Yen
(74) *Attorney, Agent, or Firm* — Fincham Downs, LLC; Magdalena M. Fincham

(57) ABSTRACT

In accordance with some embodiments, systems and methods for facilitating a game (e.g., a wagering game playable online) provide for outputting an interface for a wagering game, the interface comprising a plurality of areas among which a game element may move, wherein at least a subset of the areas comprise wagering opportunities which are available for activation, and wherein each area of the subset of the areas which comprises a wagering opportunity is occupied by a game symbol which represents the wagering opportunity. Upon determining that the game element has been moved into an area of the interface comprising a wagering opportunity the wagering opportunity may be activated (e.g., a wager may be deducted and a result determined).

26 Claims, 11 Drawing Sheets

Related U.S. Application Data

(60) Provisional application No. 61/886,050, filed on Oct. 2, 2013, provisional application No. 61/776,921, filed on Mar. 12, 2013.

(56) References Cited

U.S. PATENT DOCUMENTS

| | | | | |
|---|---|---|---|---|
| 2005/0250574 | A1* | 11/2005 | Kane | A63F 13/12<br>463/17 |
| 2009/0061999 | A1* | 3/2009 | Popovich | G07F 17/32<br>463/26 |
| 2009/0280910 | A1* | 11/2009 | Gagner | G07F 17/32<br>463/42 |
| 2010/0151943 | A1* | 6/2010 | Johnson | G07F 17/32<br>463/32 |
| 2010/0317422 | A1* | 12/2010 | Delekta | G07F 17/32<br>463/16 |
| 2014/0274316 | A1* | 9/2014 | Elias | G07F 17/34<br>463/25 |

OTHER PUBLICATIONS

International Search Report for Application No. PCT/IB2014/059688 dated Aug. 5, 2014; 5 pps.

* cited by examiner

METHODS AND SYSTEMS FOR FACILITATING A GAME WHICH ALLOWS A PLAYER TO SELECT AVAILABLE WAGERING OPPORTUNITIES

CLAIM OF PRIORITY

The present application is a continuation of International Application PCT/IB2014/059688, with an international filing date of Mar. 12, 2014 and titled METHODS AND SYSTEMS FOR FACILITATING A GAME WHICH ALLOWS A PLAYER TO SELECT AVAILABLE WAGERING OPPORTUNITIES, filed in the name of Elias et al.; which PCT application claims the benefit of priority of (i) U.S. Provisional Application No. 61/776,921 filed Mar. 12, 2013 in the name of Elias et al., titled METHODS AND SYSTEMS FOR FACILITATING A GAME WHICH ALLOWS A PLAYER TO SELECT AVAILABLE WAGERING OPPORTUNITIES; and (ii) U.S. Provisional Application No. 61/886,050 filed Oct. 2, 2013 in the name of Elias et al., titled METHODS AND SYSTEMS FOR FACILITATING A GAME WHICH ALLOWS A PLAYER TO SELECT AVAILABLE WAGERING OPPORTUNITIES. The entirety of each of these applications is incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments described herein relate to electronic games (e.g., games playable over the Internet or other network). In particular, at least some embodiments relate to game in which a player is able to selectively move a game character through an interface in accordance with predetermined rules and restrictions. In at least one embodiment, the electronic game is a wagering game.

DETAILED DESCRIPTION OF EXAMPLE EMBODIMENTS

Figure 1:
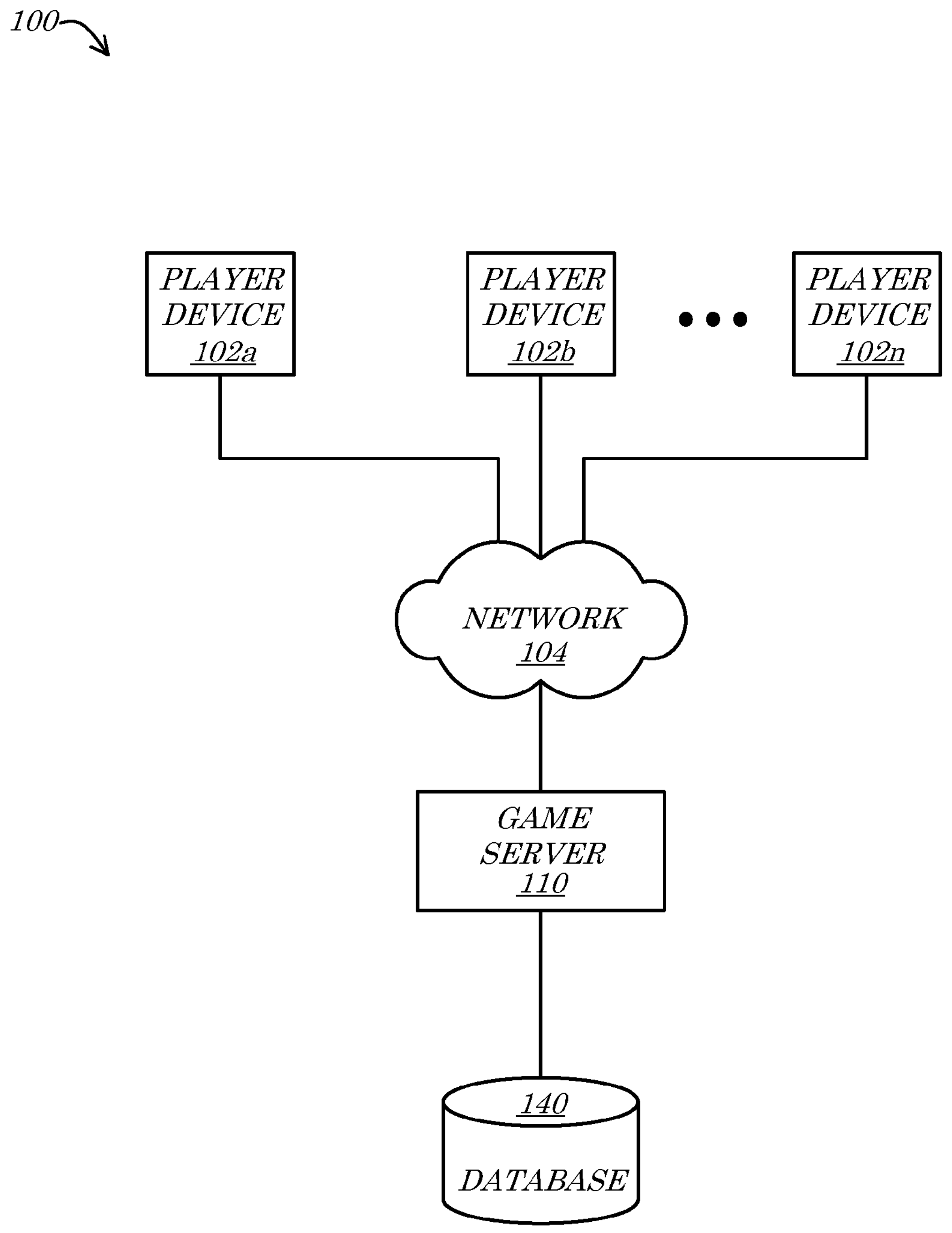
FIG. 1 is a schematic diagram of an embodiment of a gaming system in accordance with one or more embodiments described herein.

Games, whether wagering or non-wagering, are a popular past-time for millions of people all over the world. Electronic games in particular are becoming more and more popular, particularly ones playable online using a computer connected to a network. For example, according to some reports more than 200 million people play social games every month and online games recently passed e-mail as the second-most popular activity online, second only behind social networking. Accordingly, there is a need to continue to create exciting electronic games which maintain players' interest and stand out from the multitude of available online games.

Applicants have recognized that games which allow a player to develop and utilize various strategies based on rules or restrictions of the game may be more interesting to some players. Applicants have thus created a game which allows a player to develop and utilize a strategy of how to utilize his/her credit balance to activate or select wagering opportunities in a virtual world (e.g., comprising a plurality of "maps" or "areas" of the virtual world or a single map or area which the player may explore or reveal based on movements of a game element) into which wagering opportunities have been placed. In at least some embodiments the game may be playable online.

A wagering opportunity, as the term is used herein unless indicated otherwise, is a position within a game interface (e.g., within a map or area of a virtual world comprising the game interface) which, when selected by the player, causes a determination of a result and/or outcome (defined below). In some embodiments, a determination of a result and/or outcome may comprise retrieving, receiving, generating or otherwise determining a random number or pseudo-random number from a Random Number Generator (RNG), which may be a combination of software and hardware. Thus, in some embodiments, the movement of a game element into an area of a game interface defined as a wagering opportunity may cause a determination of a random or pseudo-random outcome which was previously undetermined or unknown. In other embodiments, the result or outcome may have previously been determined and associated with the wagering opportunity and merely revealed to the player upon the game element moving into an area of the game interface corresponding to the wagering opportunity (in some embodiments the outcome and/or result may have previously been determined using an RNG).

In wagering game embodiments, selection of a wagering opportunity further causes a deduction of an associated wager amount from a credit balance associated with the player. Thus, in accordance with some embodiments a player may over the course of a gaming session move a game element usable for selecting such wagering opportunities (such game element movable by the player to select wagering opportunities being referred to as the player's "game character" herein), within restrictions on movement defined by the rules of the game and in a manner which the player views as optimizing certain goals the player may have. Examples of such player goals include, without limitation, (i) maximizing the number of wagering opportunities the player may be able to select based on his credit balance, (ii) maximizing the number of "high value" wagering opportunities, (iii) decreasing the time and/or distance between wagering opportunities, maximizing the area(s) of the virtual world uncovered or traversed by the movable game element, etc). A "session" comprises a period of time spanning a plurality of event instances or turns of the game, the session having a defined start and defined end. In one embodiment, a session comprises multiple wagering opportunities activated or selected by a player, from the time a player begins playing a game to a time the player ends playing the game in a continuous period of time.

In accordance with one embodiment, each wagering opportunity corresponds to an activation of a process for determining at least one of an outcome and result of a wager. In one embodiment, such corresponding at least one of the outcome and result may be determined (e.g., by obtaining a random or pseudo-random number from a random number generator) upon (or in response to) a player selecting or activating the wagering opportunity. In some embodiments, a wagering opportunity is activated or selected when a game element is moved into an area of the game interface representing the wagering opportunity. In one embodiment, a request to a server or algorithm for generating such random or pseudo-random numbers is triggered by a player's selection or activation of a wagering opportunity in a game interface. The server or algorithm may thus generate a random number or pseudo-random number in response to receiving such a request based on a selection of a wagering opportunity by a player. In another embodiment, a server and/or algorithm may continuously generate random or pseudo-random numbers and the activation of a wagering opportunity by a player may cause a determination of the random or pseudo-random number generated at (or essentially at, such as within a tenth of a second of the selection) the time the wagering opportunity is activated. In either embodiment which employs determination of a random (or pseudo-random) number (and thus determination of a result corresponding thereto, using a probability table and/or payout schedule as would be understood by one of ordinary skill in the art) upon an activation of a wagering opportunity from a plurality of wagering opportunities available in a game interface, the outcome and/or result is not determined or knowable until the wagering opportunity is activated. In other embodiments, a result and/or outcome corresponding to a wagering opportunity may be predetermined (e.g., at a time a new game is initiated and game opportunities are placed in the game interface) and stored in a memory (e.g., a database record corresponding to a particular map or world in which the wagering opportunity is placed), and it is merely retrieved and revealed to the player when the player selects the wagering opportunity.

An "outcome" should be differentiated from a "result" in the present description in that an "outcome" is a representation of a "result", typically comprising one or more game symbols or information presented in an entertaining fashion. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface to activate wagering opportunities, an "outcome" of the game may comprise a symbol or other graphical representation of a result of the wagering opportunity which has been activated and the "result" corresponding to this outcome may be the particular number credits to be added to a player's credit meter balance. A result may be determined for a wager based on at least one of the following: (i) an output of a random number generator; (ii) a characteristic or type of wagering opportunity being activated; (iii) information associated with a player (e.g., player wagering history or preferences); and (iv) a context of the game being played (e.g., results of previously activated wagering opportunities). In one embodiment, a characteristic or type of wagering opportunity being activated may be a factor in determining a result for a wagering opportunity in the sense that different payout schedules, wager amounts and/or probability tables may be associated and used to determine results for different types of wagering opportunities (e.g., a "high value" wagering opportunity may be associated with a higher probability of obtaining a winning result than a "lower value" wagering opportunity). Examples of how different characteristics or types of wagering opportunities may impact a determination of a result are described in more detail below.

In accordance with some embodiments, a game as described herein may comprise a wagering scheme which requires player to activate one or more relatively low value wagering opportunities prior to gaining access to (or qualifying to activate) one or more relatively high value wagering opportunities. Such a wagering scheme may motivate the player to perhaps activate more wagering opportunities or different wagering opportunities (e.g., the relatively lower value wagering opportunities) than he otherwise may have in order to gain access to the higher value wagering opportunities. This may result, in some circumstances, in the player using up his available credit balance prior to gaining access to the higher value wagering opportunities or to as many of the higher value wagering opportunities as he may otherwise have been able to access. A high value wagering opportunity may comprise, for example, a wagering opportunity which is associated with a benefit (or potential benefit) to the player above that of a relatively lower value wagering opportunity. For example, a higher value wagering opportunity may be associated with a more favorable payout table. A more favorable payout table may result, for example, in at least one of a higher payback percentage, higher volatility and a higher probability of winning one or more prizes (e.g., payouts, entries to a bonus round, more favorable rules on a game, fewer restrictions being applied in playing a game, higher value payouts, etc.).

In on embodiment a selection or request for activation of a wagering opportunity may (if the activation of the wagering opportunity is authorized, in embodiments in which such authorization is required) cause at least one device to (i) deduct a wager from a credit balance associated with the player; (ii) determine a result for the wagering opportunity; and/or (iii) adjust at least one of a credit balance or other tracking mechanism associated with the player, based on the result (e.g., one or more credits (if the outcome is a winning outcome such that it corresponds to a prize) may be added to a credit balance of the player). In one embodiment, an activation of a wagering opportunity further causes an output of an outcome representing the result for the wagering opportunity or other information.

In accordance with embodiments described herein, a winning result is one in which the player wins a prize. A prize may comprise, without limitation, any reward or benefit to be provided to the player (whether tangible or intangible), such as a payout (virtual or real currency or credits), a product, service, coupon, advantage (e.g., multiplier to be applied to a payout), advancement in the game, etc.

As described, an activation or selection of a wagering opportunity refers herein, unless explicitly indicated otherwise, to a process which includes a wagering being deducted from a credit meter balance associated with the player who activated or selected the wagering opportunity (or on whose behalf the wagering opportunity was activated or selected)

and a determination of a result for the wager. The determination of the result may comprise, in some embodiments, retrieving or revealing a result which has previously been determined for the particular wagering opportunity. In other embodiments, the determination of the result may comprise communicating with a random number generator or another mechanism (which may comprise software and/or hardware) for generating an input based on which the result may be determined (e.g., a random number based on which a result comprising a payout is determined). In other words, in some embodiments an activation of a wagering opportunity in a game interface (e.g., by moving a game element into an area of the game interface comprising the wagering opportunity or associated with the wagering opportunity) may be akin to activating a "spin" mechanism or other mechanism for resolving a wager, which is done dynamically at the time the wagering opportunity is activated for wagering opportunities for which results are not predetermined.

In accordance with some embodiments, systems, processes and articles of manufacture (e.g., a non-transitory computer readable medium) provide for (i) outputting an interface for a wagering game, the interface comprising a plurality of areas among which a game element may move, wherein at least a subset of the areas comprise wagering opportunities which are available for activation (and, in some embodiments) wherein each area of the subset of the areas which comprises a wagering opportunity is occupied by a game symbol which represents the wagering opportunity); (ii) determining that the game element has been moved into an area of the interface comprising a wagering opportunity; (iii) activating, upon determining that the game element has been moved into the area, the wagering opportunity, thereby identifying an activated wagering opportunity; (iv) determining that a result of the activated wagering opportunity is a prize to be provided to a player; and (v) causing the prize to be provided to the player.

A more detailed description of some embodiments is provided below (after some additional definitions for terms used herein), with reference to various example screen shots of an illustrative and non-limiting game which may utilize some of the features and embodiments described herein.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein unless specified otherwise, may comprise any game (e.g., wagering or non-wagering, electronically playable over a network) playable by one or more players in accordance with specified rules. A game may be playable on a non-dedicated device operable to perform functions other than facilitating the game or other games, such as a personal computer online in web browsers, on a game console and/or on a mobile device such as a smart-phone or tablet computer. A game may also be playable on a dedicated device, such as a gaming terminal in a brick-and-mortar casino. "Gaming" refers to play of a game.

A "casual game", as the term is used herein unless specified otherwise, may comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein unless specified otherwise, refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein, may comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. The term "wager" and "bet" are used interchangeably herein. "Gambling" or "wagering" refers to play of a wagering game.

A "game provider", as used herein unless specified otherwise, refers to an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

A "player," as used herein unless specified otherwise, may refer to any type, quantity, and or manner of entity associated with the play of a game. In some embodiments, a player may comprise an entity (i) conducting play of an online game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game).

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), desktop computer, laptop, mobile device, tablet computer, cellular or other wireless telephones (e.g., the Apple™ iPhone™), a video game console (e.g., Microsoft™ Xbox 360™, Sony™ Plasystation™, and/or Nintendo™ Wii™), and/or handheld or portable video game device (e.g., Nintendo™ Game Boy™ or Nintendo™ DS™), a hub, a router, and a switch. Player and/or network devices may, in some embodiments, comprise one or more network components. In accordance with some embodiments, a player device may comprise a computing device that is operable to execute or facilitate the execution of a game program and used or useful by an online player for accessing an online casino or other electronic (e.g., online) game provider. A player device may comprise and/or interface with various components such as input and output devices (each of which is described in detail elsewhere herein) and, in some embodiments, one or more game servers. A player device may be a dedicated gaming device (e.g., a device dedicated to facilitating one or more games, such as a slot machine) or a non-dedicated gaming device (e.g., an iPad™ or PC). A player device may comprise any platform capable of receiving and transmitting data, including "thin-client" platforms or platforms which do not process game play data and "smart" platforms or platforms which process game play data.

"Virtual currency" as the term is used herein unless indicated otherwise, refers to an in-game currency that may be used as part of a game or one or more games provided by a game provider as (i) currency for making wagers, and/or (ii) to purchase or access various in-game items, features or powers.

A "credit balance", as the term is used herein unless indicated otherwise, refers to (i) a balance of currency, whether virtual currency or real currency, usable for making wagers in the game and/or (ii) another tracking mechanism for tracking a player's success or advancement in a game by deducting therefrom points or value for wagers made during the game (or purchases made during the game or associated with the game) and adding thereto points or value for successful results of the game (e.g., results which correspond to a payout).

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention (s). In addition, embodiments of the invention(s) can comprise several novel features and it is possible that no single feature is solely responsible for its desirable attributes or is essential to practicing the invention(s) herein described.

Turning now to FIG. 1, illustrated therein is a block diagram of an example system 100 consistent with at least some embodiments. The system 100 may comprise a plurality of player devices 102*a*-102*n* in communication with a game server 110 via a network 104. For purposes of brevity, any or all of the player devices 102*a*-102*n* will be referred to as a player device 102 herein, even though the plurality of player devices 102*a*-102*n* may include different types of player devices (as described below). The game server 110 may also be operable to communicate with or access a database 140 (which may comprise one or more databases and/or tables and which may comprise a storage device distinct from (or be a component of) the game server 110). It should be noted that in some embodiments database 140 may be stored on a game server 110 while in other embodiments database 140 may be stored on another computing device with which game server 110 is operable to communicate in order to at least access the data in database 140 (e.g., another server device remote from game server 140, operable to determine results or outputs based upon which results are determined for a wagering opportunity). In some embodiments a processor (e.g., one or more microprocessors, one or more microcontrollers, one or more digital signal processors) of a player device 102 and/or game server 110 may receive instructions (e.g., from a memory or like device), and execute those instructions, thereby performing one or more processes defined by those instructions. Instructions may be embodied in, e.g., one or more computer programs and/or one or more scripts. The instructions may comprise some or all of the steps of a process described herein (e.g., process 500 or process 600).

In some embodiments a game server 110 and/or one or more of the player devices 102 stores and/or has access to data useful for facilitating play of a game. For example, game server 110 and/or a player device 102 may store (i) one or more probability databases for determining a result of a wagering opportunity, (ii) one or more payout databases for determining an amount of a payout to provide to a player as a result of a wagering opportunity; (iii) a current state or status of a game or game session (e.g., what path(s) a game element has taken through a game interface, which wagering opportunities have been activated), (iv) one or more user interfaces for use in a game, (v) one or more game themes for a game, (vi) one or more parameters (and values thereof) for placing wagering opportunities in a game interface prior to an initiation of a game by a player, and/or (vii) profiles or other personal information associated with a player of a game (e.g., betting history of a player, results obtained by a player in a current or a past game). It should be noted that in some embodiments such data may be stored on the game server 110 and information based on such data may be output to a player device 102 during play of a game while in other embodiments a game program may be downloaded to a local memory of a player device 102 and thus such data may be stored on a player device 102 (e.g., in encrypted or other secure or tamper-resistant form).

In accordance with some embodiments, a game server 110 or another server with which the game server is operable to communicate may comprise a random number generator (RNG), which may comprise software and/or hardware for determining an output based upon which a result for a wagering opportunity may be determined. In one embodiment, the RNG may comprise an algorithm for continuously (or on demand) generating random or pseudo random numbers. As would be understood by one of ordinary skill in the art, a random number generated by an RNG may be used to determine a result for a wagering opportunity by comparing the generated random number to the plurality of ranges of random numbers in a probability table and identifying the result which corresponds to the range within which the generated random number fits.

A game server 110 may comprise a computing device for facilitating play of a game (e.g., by receiving an input from a player (e.g., an activation of a wagering opportunity via movement of a game element into an area corresponding to the wagering opportunity)), determining a result for an activated wagering opportunity (e.g., cards dealt and/or winner of the hand), causing data of a game (e.g., representations of wagering opportunities in a game interface) to be displayed on a player device, facilitating a wager and/or a provision of a payout for a game. For example, the game server 110 may comprise a server computer operated by a game provider or another entity (e.g., a social network website not primarily directed at providing games). In some embodiments, the game server may determine data (e.g., a random number from an RNG to use for determination of a result for a wagering opportunity) for a game by requesting and receiving such data from another remote server operable to provide such data. In some embodiments, the game server 110 may further be operable to facilitate a game program for a game (e.g., a wagering game). In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, managing accounts, controlling games, etc). In some embodiments, game server 110 may comprise two or more server computers operated by the same entity (e.g., one server being primarily for storing states of games in progress and another server being primarily for storing mechanisms for determining outputs usable to determine results of wagering opportunities, such as a random number generator). Examples of processes that may be performed by the game server 110 (directly or indirectly) may include, but are not limited to: (i) determining a bet decision of a player (e.g., determining that a player has activated a wagering opportunity); (ii) determining whether a pre-requisite for a wagering opportunity has been satisfied, thereby determining whether a request to activate a wagering opportunity may be granted; (iii) determining an instruction from a player directing movement of a game element within a game interface and/or effectuating movement of the game element based on such instruction from the player; (iv) determining or generating a configuration for a game interface of a game (e.g., a type and/or number of wagering opportunities to place in the game interface, locations for the wagering opportunities, locations of obstacles within the game interface, etc.); (v) authorizing a game program to be downloaded to a player device; (vi) authorizing an amount of value to be added to or removed from an account of a player (e.g., based on a result of a wagering opportunity); (vii) determining that a player has qualified for a bonus round (e.g., based on a level of a bonus meter) and outputting game data for the bonus round; and/or (vii) updating a meter or tracking mechanism for tracking a player's qualification to remain in the bonus round (e.g., a bonus round meter may be incremented or decremented based on results of wagering opportunities activated during the bonus round, as described in more detail below).

Turning now to a description of a player device 102, in accordance with some embodiments a player device 102 may comprise a computing device that is operable to execute or facilitate the execution of a game program and used or useful by an online player for accessing an online casino or other electronic (e.g., online) game provider. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ Playstation™, and/or Nintendo™ Wii™), and/or handheld or portable video game devices (e.g., Nintendo™ Game Boy™ or Nintendo™ DS™). A player device 102 may comprise and/or interface with various components such as input and output devices (each of which is described in detail elsewhere herein) and, in some embodiments, game server 110. A player device 102 may be a dedicated gaming device (e.g., a slot machine or video poker type of machine) or a non-dedicated gaming device (e.g., a smart phone, tablet, laptop or desktop computer). It should be noted that a game server 110 may be in communication with a variety of different types of player devices 102.

A player device 102 may be used to play a wagering or non-wagering game (e.g., a social or casual game) over a network and output information relating to the game to players participating in the game (e.g., locations of wagering opportunities within a game interface, suggested paths for a game element through the game interface, a result of a wagering opportunity, credit balance of credits available for play of the game, etc.). Any and all information relevant to any of the aforementioned functions may be stored locally on one or more of the player devices 102 and/or may be accessed using one or more of the player devices 102 (in one embodiments such information being stored on, or provided via, the game server 110). In another embodiment, a player device 102 may store some or all of the program instructions for determining, for example, (i) that a wagering opportunity has been activated or a request to activate a wagering opportunity has been received (and, in some embodiments, communicating such an activation or request for activation to game server 110); (ii) outputting an indication of a result of a wagering opportunity to a player, (iii) modifying a game interface base on at least one input from a player (e.g., a movement by the player of a game element within the game interface) and/or at least one input from the game server 110 (e.g., a result for a wagering opportunity); (iv) determining that a player has qualified for a bonus round and outputting game data for the bonus round; and/or (iv) updating a meter or tracking mechanism for tracking a player's qualification to remain in the bonus round (e.g., a bonus round meter may be incremented or decremented based on results of wagering opportunities activated during the bonus round, as described in more detail below). A "bonus round meter" is also referred to herein as a bonus mode eligibility meter.

In some embodiments, the game server 110 may be operable to authorize the one or more player devices 102 to access information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102 may be terminals for displaying to an associated player such outcomes and results and other graphics and data related to a game.

It should be noted that the one or more player devices 102 may each be located at the same location as at least one other player device 102 (e.g., such as in a casino or internet café) or remote from all other player devices 102. Similarly, any given player device may be located at the same location as the game server 110 or may be remote from the game server 110. It should further be noted that while the game server 110 may be useful or used by any of the player devices 102 to perform certain functions described herein, the game server 110 need not control any of the player devices 102. For example, in one embodiment the game server 110 may comprise a server hosting a website of an online casino accessed by one or more of the player devices 102.

In one embodiment, a game server 110 may not be necessary or desirable. For example, some embodiments described in this disclosure may be practiced on one or more player devices 102 without a central authority. In such an embodiment, any functions described herein as performed by a game server 110 and/or data described as stored on a game server 110 may instead be performed by or stored on one or more player devices 102. Additional ways of distributing information and program instructions among one or more player devices 102, a game server 110 and/or another server device will be readily understood by one skilled in the art upon contemplation of the present disclosure.

Figure 2:
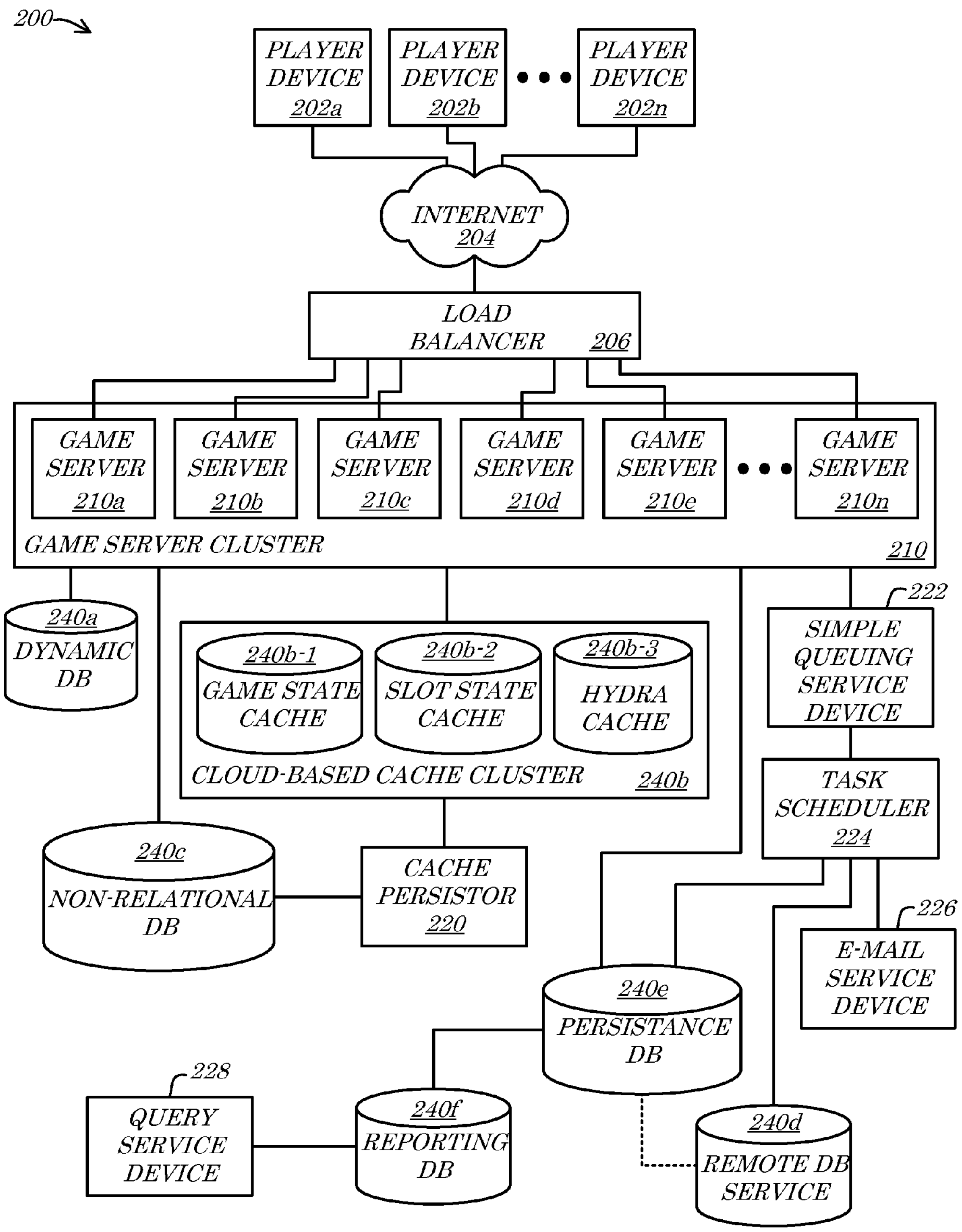
FIG. 2 is a schematic diagram of an embodiment of a social gaming platform in accordance with one or more embodiments described herein.

Referring now to FIG. 2, illustrated therein is a block diagram of a system 200 according to some embodiments. In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player device 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof (e.g., a game in which a player moves a game character within a game interface, in accordance with certain restrictions on the movement of the character, in order to activate wagering opportunities placed strategically throughout the game interface, as described herein). In some embodiments, the various game servers 210*a-n* (virtual and/or physical) of the game server cluster 210 may be configured to provide, manage, host, and/or conduct individual instances of available game types. A first game server 210*a*, for example, may host a first particular instance of an online game (or tournament), a second game server 210*c* may host a second particular instance of the online game (or tournament), a third game server 210*c* may facilitate a multi-player version of the online game, and/or a fourth game server 210*d* may provide a different version of the online game or a different online game entirely.

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer. In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/stickiness). In some embodiments, the load balancer 206 may comprise one or more devices and/or services provided by a third-party (not shown). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types, if any, the game server cluster 210 may provide game outcomes to a controller device (not separately shown in FIG. 2) that times the release of game outcome information to the player devices 202*a-n* such as by utilizing a broadcaster device (also not separately shown in FIG. 2) that transmits the time-released game outcomes to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DynamoDB™ service provided by Amazon® Web Services, LLC. The dynamic DB 240*a* may, for example, store information specific to one or more certain game types (e.g., a multi-player poker game) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, card game state (e.g., card-game specific state) data may be stored in the game state cache 240*b*-2, and/or other game and/or player information (e.g., progressive data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve bet cycle and/or other game event information and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

Figure 3:
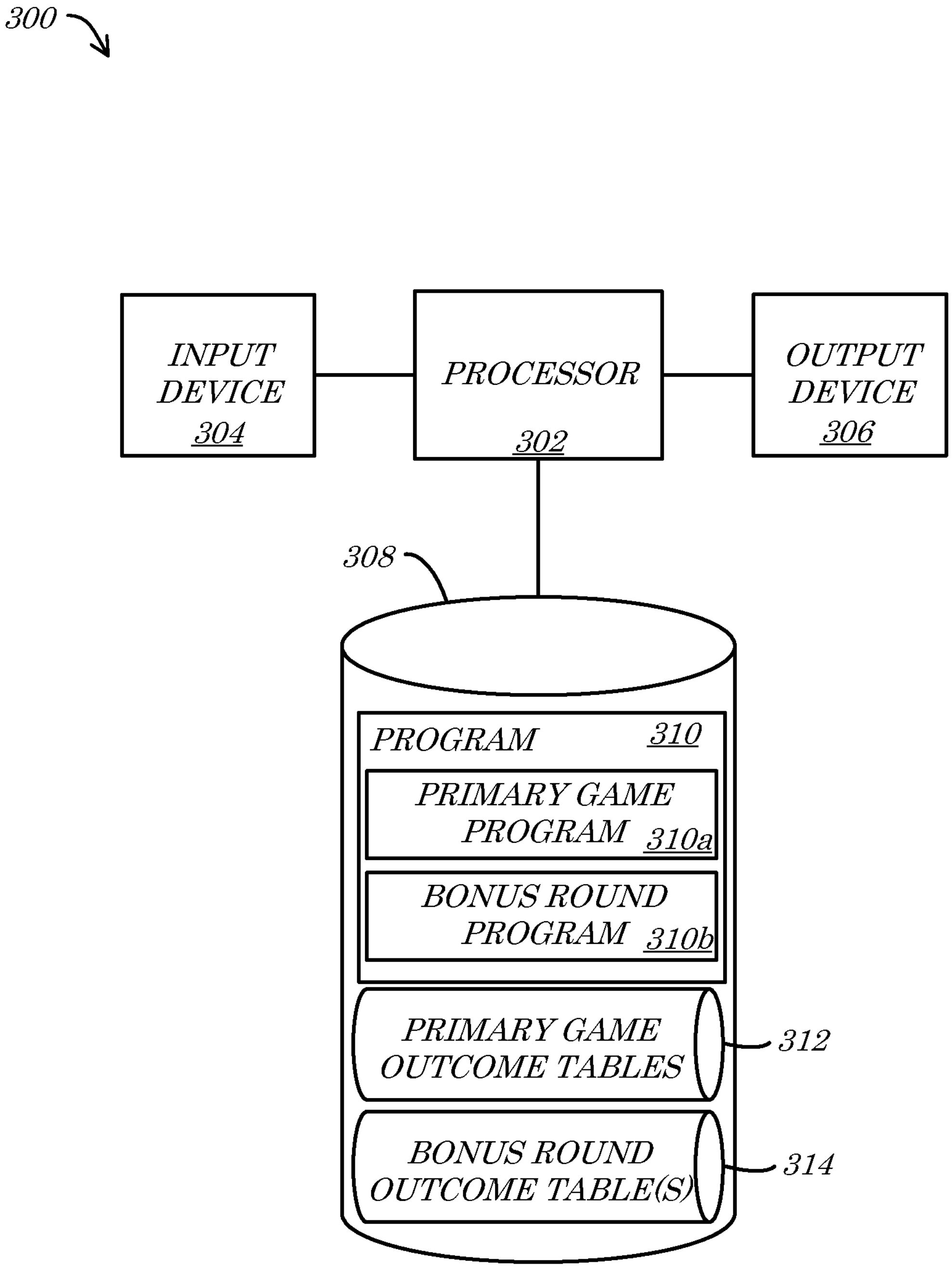
FIG. 3 is a block diagram of an embodiment of a computing device useful in a system according to one or more embodiments described herein.

Referring now to FIG. 3 is a block diagram of an apparatus 300 according to some embodiments. In some embodiments, the apparatus 300 may be similar in configuration and/or functionality to any of the player devices 102, the game server 110 and/or another server device operable to facilitate the embodiments described herein. The apparatus 300 may, for example, execute, process, facilitate, and/or otherwise be associated with any of the processes 500 and 600 described herein with reference to FIGS. 5 and 6, respectively.

In some embodiments, the apparatus 300 may comprise a processor 302, an input device 304, an output device 306 and/or a memory device 308. Fewer or more components and/or various configurations of the components 302, 304, 306 and/or 308 may be included in the apparatus 300 without deviating from the scope of embodiments described herein.

According to some embodiments, the processor 302 may be or include any type, quantity, and/or configuration of processor that is or becomes known. The processor 302 may comprise, for example, an Intel® IXP 2800 network processor or an Intel® XEON™ Processor coupled with an Intel® E7501 chipset. In some embodiments, the processor 302 may comprise multiple inter-connected processors, microprocessors, and/or micro-engines. According to some embodiments, the processor 302 (and/or the apparatus 300 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 302 comprises a server such as a blade server, necessary power may be supplied via a standard AC outlet, power strip, surge protector, and/or Uninterruptible Power Supply (UPS) device.

In some embodiments, the input device 304 and/or the output device 306 are communicatively coupled to the processor 302 (e.g., via wired and/or wireless connections and/or pathways) and they may generally comprise any types or configurations of input and output components and/or devices that are or become known, respectively.

The input device 304 may comprise, for example, a keyboard that allows an operator of the apparatus 300 to interface with the apparatus 200 (e.g., by a player, an employee or other worker affiliated with either an online casino or other entity operating a system which provides games to players). In some embodiments, the input device 304 may comprise a mechanism configured to indicate to a remote server device (e.g., game server 110) an initiation of an event and/or a bet decision of a player during a game (e.g., a movement of a game element and/or requested to activate a wagering opportunity), such information being provided to the apparatus 300 and/or the processor 302. In such embodiments, the input device may comprise a key on a keyboard of the apparatus 300. Other examples of input devices include, but are not limited to: a game controller and/or gamepad, a bar-code scanner, a magnetic stripe reader, a pointing device (e.g., a computer mouse, touchpad, and/or trackball), a point-of-sale terminal keypad, a touch-screen, a microphone, an infrared sensor, a sonic ranger, a computer port, a video camera, a motion detector, a digital camera, a network card, a Universal Serial Bus (USB) port, a GPS receiver, a Radio Frequency Identification (RFID) receiver, a RF receiver, a thermometer, a pressure sensor, and a weight scale or mass balance.

The output device 306 may, according to some embodiments, comprise a display screen and/or other practicable output component and/or device that is operable to output information. The output device 306 may, for example, comprise a display screen via which are output instructions, guidance, questions or information to a player of an online game. For example, the output device may output a game interface for outputting a current game state of a game (e.g., the paths already explored or moved along by a game element, available wagering opportunities, obstacles within the game interface, a current credit meter balance, a current level of a bonus round meter, a current status of a collection of game symbols being collected by the player, etc.). Some additional examples of output devices that may be useful in some embodiments include a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a data port. According to some embodiments, the input device 304 and/or the output device 306 may comprise and/or be embodied in a single device such as a touch-screen monitor.

In some embodiments, the apparatus 300 may comprise any type or configuration of communication device (not shown) that is or becomes known or practicable. For example, the apparatus 300 may include a communication device such as a NIC, a telephonic device, a cellular network device, a router, a hub, a modem, and/or a communications port or cable. In some embodiments, the communication device may be coupled to provide data to a telecommunications device. The communication device may, for example, comprise a cellular telephone network transmission device that sends signals (e.g., a request to activate a wagering opportunity) to a server (e.g., game server 110) in communication with a plurality of player devices 102. According to some embodiments, the communication device may also or alternatively be coupled to the processor 302. In some embodiments, the communication device may comprise an IR, RF, Bluetooth™, and/or Wi-Fi® network device coupled to facilitate communications between the processor 202 and another device.

The memory device 308 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 308 may, according to some embodiments, store a program 310 for facilitating one or more of the embodiments described herein, which program may include a primary game program 310*a* for facilitating play of game as described herein and a bonus round program 310*b* for facilitating a bonus round once a player qualifies for a bonus round and/or for tracking a player's progress towards qualifying for a bonus round based on events in the primary game. In some embodiments, the primary game program 310*a* and/or the bonus round program 310*b* may be utilized by the processor 302 to provide output information via the output device 306.

The primary game program 310*a* may, for example, comprise instructions for (i) determining a configuration or game state for a game upon initiation of a new game by a player, (ii) recognizing and/or storing indications of movement of a game element within the game interface; (iii) modifying a game state based on events in the game (e.g., movement of game element, results of wagering opportunities, etc.), (iii) determining a result for a wagering opportunity; (iv) determining, tracking and/or storing a player's progress towards qualifying for a bonus round (e.g., based on results determined during the primary game), (v) updating a credit meter balance based on wagers made during the primary game and prizes won during the primary game; and/or (vi) determining a status of a collection of symbols being collected by a player (e.g., based on wagering opportunities activated by the player). The bonus round program 310*b* may, for example, comprise instructions for (i) moving a game element within a game interface on behalf of a player during the bonus round; (ii) determining results of wagering opportunities activated during the bonus round; (iii) determining, tracking and/or storing events in a bonus round (e.g., level of bonus round meter based on results determined in the bonus round), and/or (iv) updating a credit meter balance based on wagers made during the primary game and prizes won during the primary game. In some embodiments, the primary game program 310*a* and the bonus round program 310*b* are subroutines of a single program. In some embodiments, some of the functionality described herein as being performed by the bonus round program 310*b* may additionally or alternatively be performed by the primary game program 310*a* or vice versa. In some embodiments, either or both of the primary game program 310*a* and the bonus round program 310*b* (or any portion of either of these programs) may additionally or alternatively (e.g., in embodiments in which a player device is a thin client device) be stored and performed by another device (e.g., game server 110).

In accordance with some embodiments, the memory device 308 may store one or more tables or databases usable to determine results for wagering opportunities during the game. For example, the memory device 308 may store one or more primary game outcome table(s) 312 and/or one or more bonus round outcome table(s) 314. As described herein, in some embodiments at least one output or datum (e.g., a random number generated by an RNG) may be utilized to identify a result of a wagering opportunity using a probability table. In some embodiments, there may be several probability tables available and one is selected based on one or more relevant factors (e.g., wager amount, wagering opportunity characteristic, player identifier or characteristic, current or past game state for a current game, etc.). In some embodiments, some or all of the data described herein as being stored in any or all of the databases 312 and 314 may additionally or alternatively be stored at another device (e.g., game server 110).

Turning now to FIGS. 4A through 4G, illustrated therein is one example embodiment of a game interface (e.g., a screen shot of an online game) for facilitating a game according to some embodiments described herein, as it is adjusted or modified based on events (e.g., movement of a game element, results of activated wagering opportunities, collection of symbols representing activated wagering opportunities, updating of a bonus round meter based on events in the game) during play of the game. In particular, FIGS. 4A through 4G illustrate how the game progresses as the game element is moved throughout the environment of the game (i.e., about the game interface). In a non-limiting and illustrative example, the game illustrated in FIGS. 4A through 4G is a "sweets" themed game called MONSTER CRAVINGS™. In the game a player (or a processor on behalf of a player, in an auto-play mode of a bonus round) moves a game element comprising a character which looks like a friendly monster through an under-ground themed virtual world (the monster being animated to "dig" through the dirt in the underground world as it moves about the environment). Placed throughout the virtual underground environment comprising the game interface are various game symbols which look like "sweets" (e.g., cupcakes, popsicles, cookies, donuts, candy, etc.). Each game symbol in the form of a sweet represents a wagering opportunity which has been placed in the virtual world. When the monster game element moves into a location of the game interface occupied by a sweet (e.g., the monster digs his way towards the sweet and continues moving until he is occupying the spot in which the sweet was placed) it is considered a request to activate the wagering opportunity represented by the sweet. In one embodiment, an animation showing the monster "eating" the sweet may be output when the monster game element moves into the space occupied by the sweet.

It should be noted that the example embodiments of interface mechanisms, designs and structures illustrated in the FIGS. 4A through 4G may be interfaces output via a display of a player device (e.g., via a web browser or graphical user interface client program displaying information of an online game).

In the present application, like reference numerals in the Figures refer to like elements. Thus, for example, in the FIGS. 4A through 4G (which show a progression of a game as a game element is moved about the game interface and wagering opportunities are activates and other game events occur), area 402 is repeated through each of the FIGS. 4A-4G as illustrating a player's available credit balance (although it may be shown to output different values, depending on wagers placed and payouts won).

It should be noted that additional information may be output to the player via the interface illustrated in FIGS. 4A through 4G, which additional information is omitted herein for purposes of brevity. For example, session information, player history or preferences, other available bonus features available to all players participating in the game, information about other games the player is participating in, recommendations or tips for game strategy, etc. may be shown.

Figure 4A:
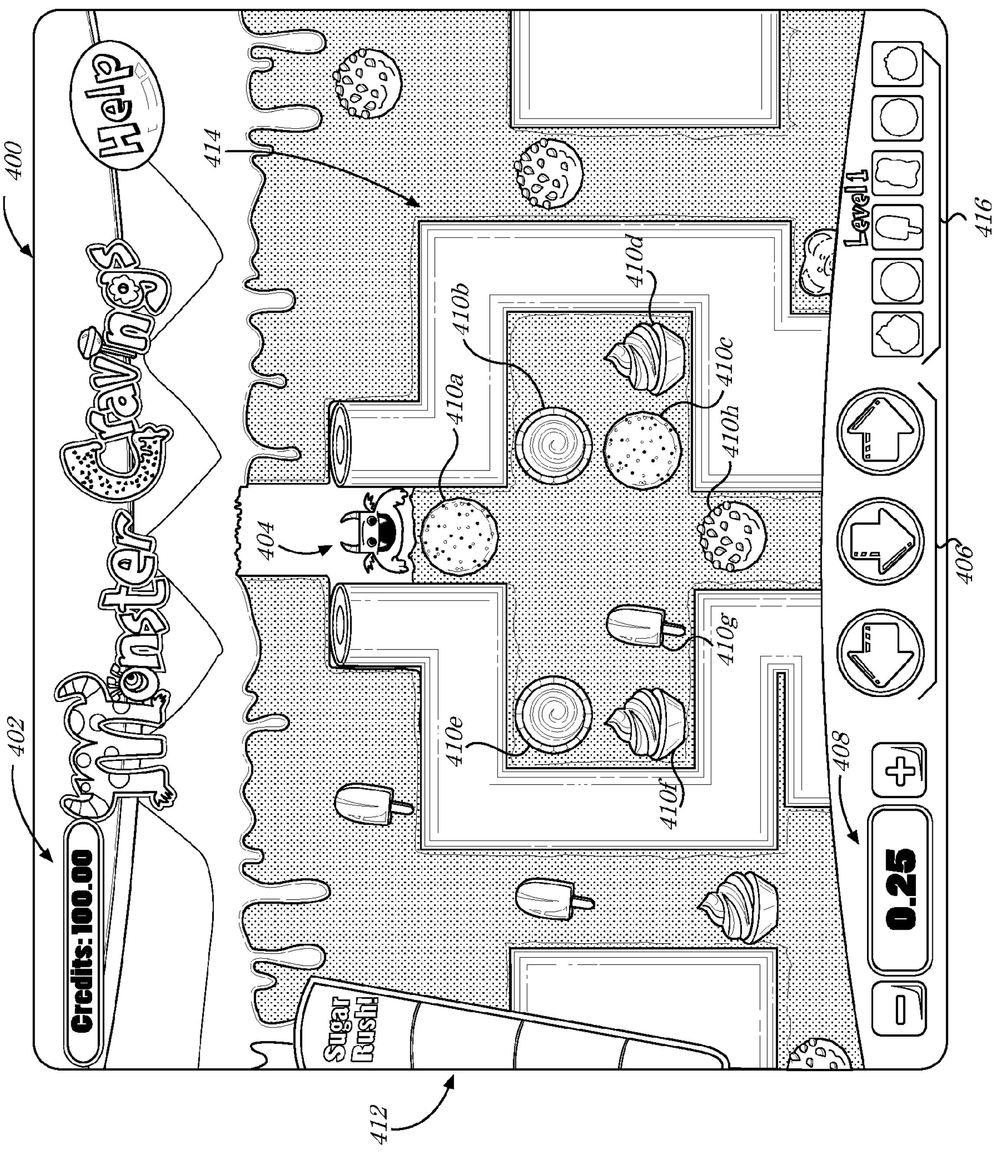
FIGS. 4A through 4G together illustrate one example embodiment of a game interface (e.g., a screen shot of an online game) for facilitating a game, as it is modified based on movement of a game element by a player and/or other events which occur in the game, in a manner consistent with one or more embodiments described herein.

Referring specifically now to FIG. 4A, a game interface 400 comprises a virtual environment within which a game element 404 may be moved. The game interface 400 further comprises various areas which may be utilized to output information to a player and/or to receive input from a player. In accordance with one example environment, the game interface 400 comprises a game interface of for the MONSTER CRAVINGS™ game and particularly one level or portion of an underground virtual world. In accordance with some embodiments, the player may reveal additional portions of the game interface or virtual world by moving the game element 404 around the game interface 400 (e.g., the virtual environment may be several layers deep and the game element may be moved in a downward direction, perhaps through wagering opportunities which have to be activated in order to gain access to lower levels of the virtual world).

The game interface 400 of FIG. 4A illustrates the game interface in an initial state, depicting a new game state (e.g., as it may be output to a player when the player starts playing the game or resets or restarts the game state). Prior to the new game state of the game interface being output, a process for determining a configuration of the game interface (e.g., where wagering opportunities are to be placed, which game symbols are to be used to represent wagering opportunities, etc.) may be generated, either in response to a player requesting a new game state or at another time (e.g., new game states may be generated and stored for retrieval upon a player requesting a new game state). A detailed discussion of how a new game state may be generated is provided herein with respect to process 500 of FIG. 5 and will be not repeated in this part of the description for purposes of brevity. In FIG. 4A the game character 404 is shown at a starting position in the game interface 400, with a starting credit balance of 100.00 credits shown in area 402.

Area 406 illustrates, in accordance with one example embodiment, the input selections a player may utilize to move the game element 404 through the virtual world of the game interface 400. As can be seen from the input selections of area 406, in the present example embodiment the game element 404 may be moved down, left or right (as indicated by the arrows which comprise input mechanisms for moving the game character in the represented direction) but not down. Accordingly, with the restriction of not being able to move the game element back up in the game interface, a player will need to make some decisions about the path for the game element and which sweets the game character will "eat" (i.e., which wagering opportunities the player will activate) since once the player moves the game element down past a level of a particular sweet or wagering opportunity, the player will not be allowed to move the game element back up to such wagering opportunity. Again, the restriction of not being able to move a game element up (or diagonally) is an example restriction only, to illustrate that movement restrictions on a game element may cause a player to make decisions as to which wagering opportunities may need to be foregone in favor of others. Other types of movement restrictions on a game element are also contemplated. For example, obstacles may be placed in the game interface, through which obstacles the game element cannot move but rather has to go around. The "pipe" obstacle labeled as 414 in FIG. 4A is one example of such an obstacle which may restrict movement of a game character towards available wagering opportunities. In some embodiments, a player may win or qualify for (e.g., as a result of an activated wagering opportunity) a benefit which removes one or more such restrictions (e.g., for a limited period of time). For example, a player may win a "movement bonus" which allows the player to move the game element up for the next one (1) minute or allows the game element to move "through" obstacles rather than having to go around them.

FIG. 4A further illustrates a plurality of wagering opportunities placed throughout the game interface 400, each available wagering opportunity being represented by a respective game symbol 410*a* through 410*h* (additional game symbols representing available wagering opportunities are also illustrated but, since these will not be referenced specifically in the present description they have not been assigned reference numerals). The player may select and request to activate an available wagering opportunity by moving the game element 404 over a particular wagering opportunity or symbol representing a wagering opportunity. As can be seen, consistent with some embodiments, some wagering opportunities may be "behind" other wagering opportunities such that a player may be required to select a first wagering opportunity in order to select a second wagering opportunity. For example, in the embodiment of FIGS. 4A-4G, (i) in order to qualify to activate any of the wagering opportunities represented by the respective game symbols 410*b*-410*h*, the wagering opportunity represented by game symbol 410*a* must first be activated; (ii) the wagering opportunity represented by game symbol 410*d* may only be activated after the wagering opportunity represented by game symbol 410*c* is activated; and (iii) the wagering opportunity represented by game symbol 410*f* may only be activated after wagering opportunity represented by game symbol 410*g* is activated. In other words, activation of a first wagering opportunity may, in some embodiments, be a prerequisite for being able to activate a second wagering opportunity.

As described above, in accordance with some embodiments activation of a wagering opportunity causes an associated wager to be deducted from the player's credit balance. In the example of FIG. 4A, area 408 illustrates that the current wager is set for 0.25 credits such that a selection of a wagering opportunity will result in 0.25 credits begin deducted from the credit balance indicated in area 402.

In accordance with some embodiments, there may be different types of wagering opportunities available. For example, some may be designated as "special" or different in one or more ways from other wagering opportunities. For example, some wagering opportunities may be designated as "high value" wagering opportunities in that they are associated with one or more advantageous or benefits. Selection of such a special or high value wagering opportunity may, for example, cause (i) a higher wager to be deducted from the player's credit balance (e.g., 2X the otherwise default wager); (ii) a more favorable probability table to be accessed in determining a result of the wagering opportunity; (iii) a higher likelihood of some secondary benefit being obtained by the player (e.g., a higher likelihood of the player obtaining a special power or ability or collecting some secondary game symbol which may qualify the player for some bonus aspect of the game or a higher likelihood of triggering a bonus or other special feature of the game); (iv) a multiplier being applied to a prize which the player may win as a result of the wagering opportunity; and/or (v) a more favorable payout table being used to determine a result of the wagering opportunity (e.g., one with higher value prizes). Thus, returning to the concept of certain wagering opportunities only being selectable if other wagering opportunities are first selected, if in FIG. 4A the wagering opportunity represented by game symbol 410*d* (in the illustrative embodiment of a cupcake) were designated as a special or high value wagering opportunity, a player may be tempted to select the wagering opportunity represented by symbol 410*c* in order to gain access to the high value wagering opportunity represented by game symbol 410*d*.

A special or high value wagering opportunity may be identified to a player as such in a variety of different manners. For example, only certain game symbols may be utilized to represent high value wagering opportunities (e.g., in some embodiments, all cupcakes represent high value wagering opportunities). In another example, high value wagering opportunities may be indicated by "glowing", being highlighted, vibrating or having some other special visual effect imposed thereon.

In some embodiments, an event within a game or game session may cause one or more wagering opportunities to become high value wagering opportunities. For example, if a player successfully collects a predetermined number of certain game symbols, this may cause one or more available wagering opportunities to become high value wagering opportunities. In another embodiment, a player may win an ability to designate a wagering opportunity or type of game symbol as a high value wagering opportunity. In one embodiment, there may be different variants of high value or special wagering opportunities. For example, a first type of special wagering opportunity may be associated with a higher wager and higher corresponding prize possibilities while another type of special wagering opportunity may be associated with a higher likelihood (or a likelihood) of triggering a bonus feature or opening a new level of the game. In such embodiments, different visual effects may be utilized to identify the different types of high value wagering opportunities to a player. Of course, in some embodiments, a high value wagering opportunity may not be identified as such to a player until the player selects it (e.g., the player may be surprised to learn that a wagering opportunity he selected turns out to be a high value or special wagering opportunity), this encouraging players to select as many wagering opportunities as possible in anticipation of discovering a high value wagering opportunity. A more detailed discussion of high value wagering opportunities is provided herein with respect to process 500 of FIG. 5 and will be not repeated in this part of the description for purposes of brevity.

In some embodiments, some representations of wagering opportunities (e.g., sweets in the presently illustrated example embodiment) may not in fact be representations of wagering opportunities but rather may be prerequisite purchases or expenditures required by a player in order for the player to gain access to other wagering opportunities. For example, certain representations of wagering opportunities, although resulting in an amount of credits being deducted from the player's credit balance, may not in fact be associated with any possible win (e.g., a random number or pseudo-random number is not determined based on the selection of such a representation by the player) but the selection of such a representation may clear the path for the player such that the player may then select another wagering opportunity which is in fact associated with a possibility of winning a prize. Similarly, certain wagering opportunities may be "low value" wagering opportunities in that while they may be associated with a possible win of a prize, such prize may be of lower value (or lower perceived value) than other (e.g., default value) wagering opportunities. For example, in some embodiments certain types of wagering opportunities may be associated with possible wins of some types of prizes (e.g., game symbols the player is collecting, certain powers or abilities, triggering of a bonus feature) but not other types of prizes (e.g., credits to be added to the player's credit meter balance).

The game interface 400 further includes a bonus mode eligibility meter 412 (referred to as a "Sugar Rush Meter" in the example implementation of the MONSTER CRAVINGS™ illustrative game), which tracks a player's progress towards initiating a bonus mode of the game. In the example of FIGS. 4A-4G the bonus mode is a mode in which the game element 404 is moved automatically on behalf of a player and in accordance with a predetermined algorithm which is programmed to accomplish certain goals (e.g., as determined by a game provider). For example, the game element 404 may be moved to the next wagering opportunity that is the shortest distance from a current position of the game element of all available wagering opportunities. In one example embodiment, each wagering opportunity selected automatically on behalf of the player in such a bonus mode by moving the game element 404 onto the location of the wagering opportunity may be "free" in the sense that while the player may be provided with any prize determined as a result of the activation of the wagering opportunity, no wager is deducted from the player's credit balance in exchange for the activation of the wagering opportunity. In other embodiments, a reduced or full wager may be deducted from the player's credit balance during such a bonus mode and/or the player may be provided with other benefits during the bonus mode. In accordance with one example embodiment, each time a player obtains a qualifying result or achieves a qualifying event in the game (e.g., each time the player obtains a prize as a result of a wagering opportunity selected by the player), the bonus mode eligibility meter 112 is incremented by a predetermined amount (e.g., to the next available value). Once the bonus mode eligibility meter 112 is filled to the top mark (i.e., achieves the highest possible value or a predetermined value), the game enters a bonus mode (referred to as a "Sugar Rush" mode in the example implementation of the MONSTER CRAVINGS™ illustrative game).

In accordance with one embodiment, during an active Sugar Rush mode, the bonus mode eligibility meter 112 may be used to track when to terminate the Sugar Rush bonus mode. For example, in accordance with one embodiment, during a Sugar Rush bonus mode, each winning wagering opportunity (i.e., each time the player obtains a prize as a result of a wagering opportunity selected by the game character on behalf of the player), the bonus mode eligibility meter 112 is incremented by a predetermined value such as one (or maintained at a current level) while for each non winning wagering opportunity (i.e., each time a wagering opportunity selected on behalf of the player does not result in any prize or a qualifying prize), the bonus mode eligibility meter 112 is decremented by a predetermined value (e.g., by one). Of course, the bonus mode eligibility meter used to track eligibility to continue play of the bonus mode may be incremented or decremented by amounts other than one (1)

and based on events other than winning or non-winning outcomes. For example, in some embodiments such a meter may be incremented by a first predetermined amount when a first corresponding predefined symbol or event occurs during game play in the bonus mode and decremented by a second predetermined amount (which may or may not be different from the first amount) when a second predefined symbol or event occurs during game play in the bonus mode.

In accordance with some embodiments, one or more game symbols may be "collected" during the game. A game symbol may be collected, for example, by moving the game element over the game symbol or into the space of the game interface occupied by the game symbol. In the example embodiment of FIGS. 4A-4G, a game symbol comprising a sweet may be collected by being "eaten" by the monster game character 404. In accordance with some embodiments, a player may earn a prize or benefit (e.g., a bonus payout, advantage in the game, access to an additional level of the game, a multiplier, etc.) by successfully completing a collection of symbols. In one embodiment a player may be asked to collect a plurality of instances of the same type of symbol (e.g., 10 cupcakes) in order to qualify for the prize or benefit. In another embodiment, a player may be asked to collect one of a plurality of different types of symbols. This latter embodiment is illustrated in FIGS. 4A-4G. In particular, area 416 of the game interface 400 depicts shapes of the different game symbols to be collected. When a player collects a certain type of collectible symbol, this collection of the symbol is reflected in the game interface (e.g., the shape of the game symbol in the area 416 is filled in with a representation of the game symbol). Of course, many different schemes for representing collections of game symbols and the status of such collections would be appreciated by one of ordinary skill in the art upon reading the present description and the embodiments are not limited to any particular scheme for depicting a symbol collection game mechanic.

Figure 4B:
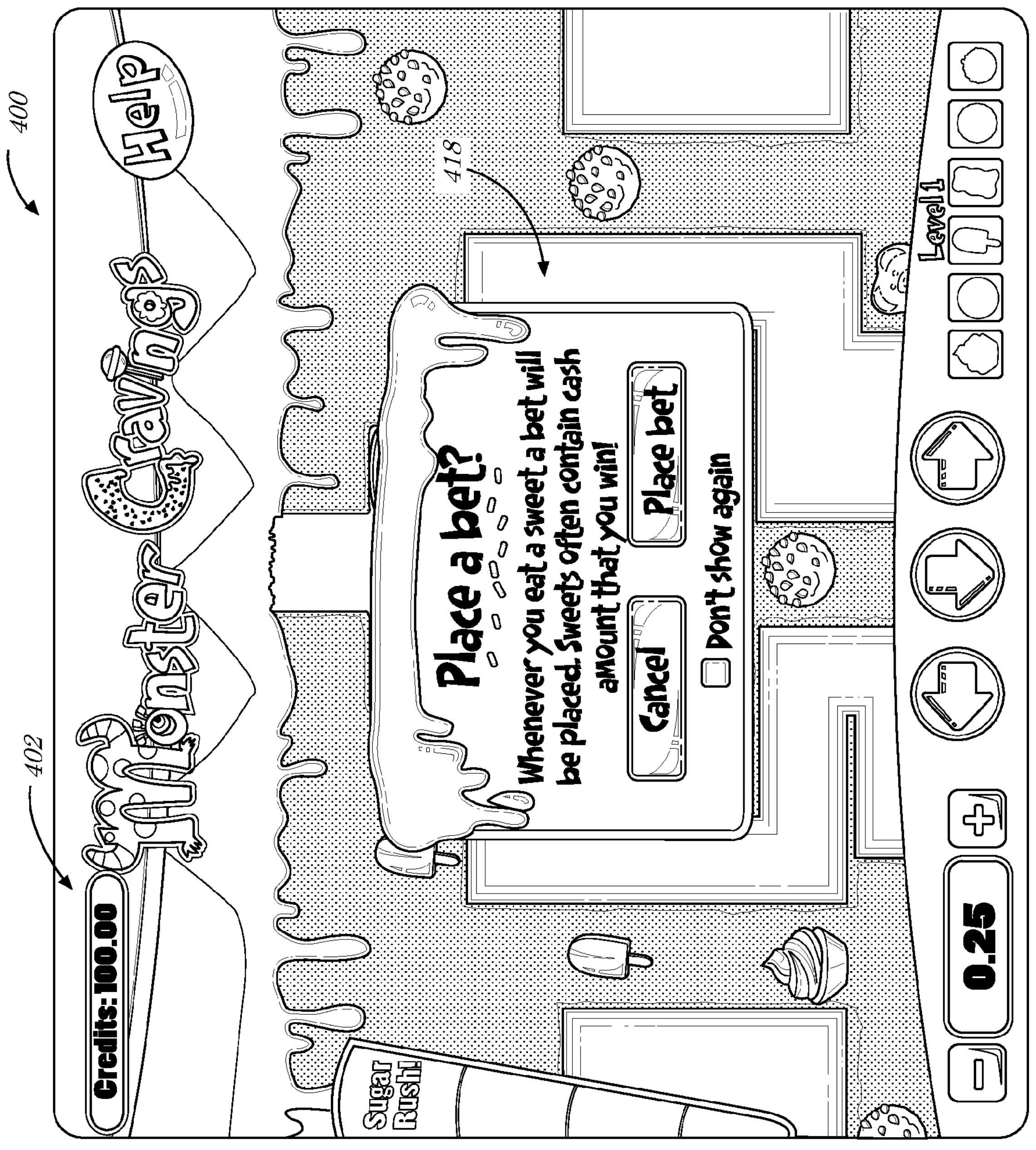

Turning now to FIG. 4B, illustrated therein is a version of the game interface 400 onto which is output a message 418, which may be output (e.g., as a pop-up screen) to a player of the game illustrated in FIGS. 4A-4G. The message may, for example, explain some of the rules of the game. Such a message may be output to a player, for example, prior to initiation of a new game or game session.

Figure 4C:
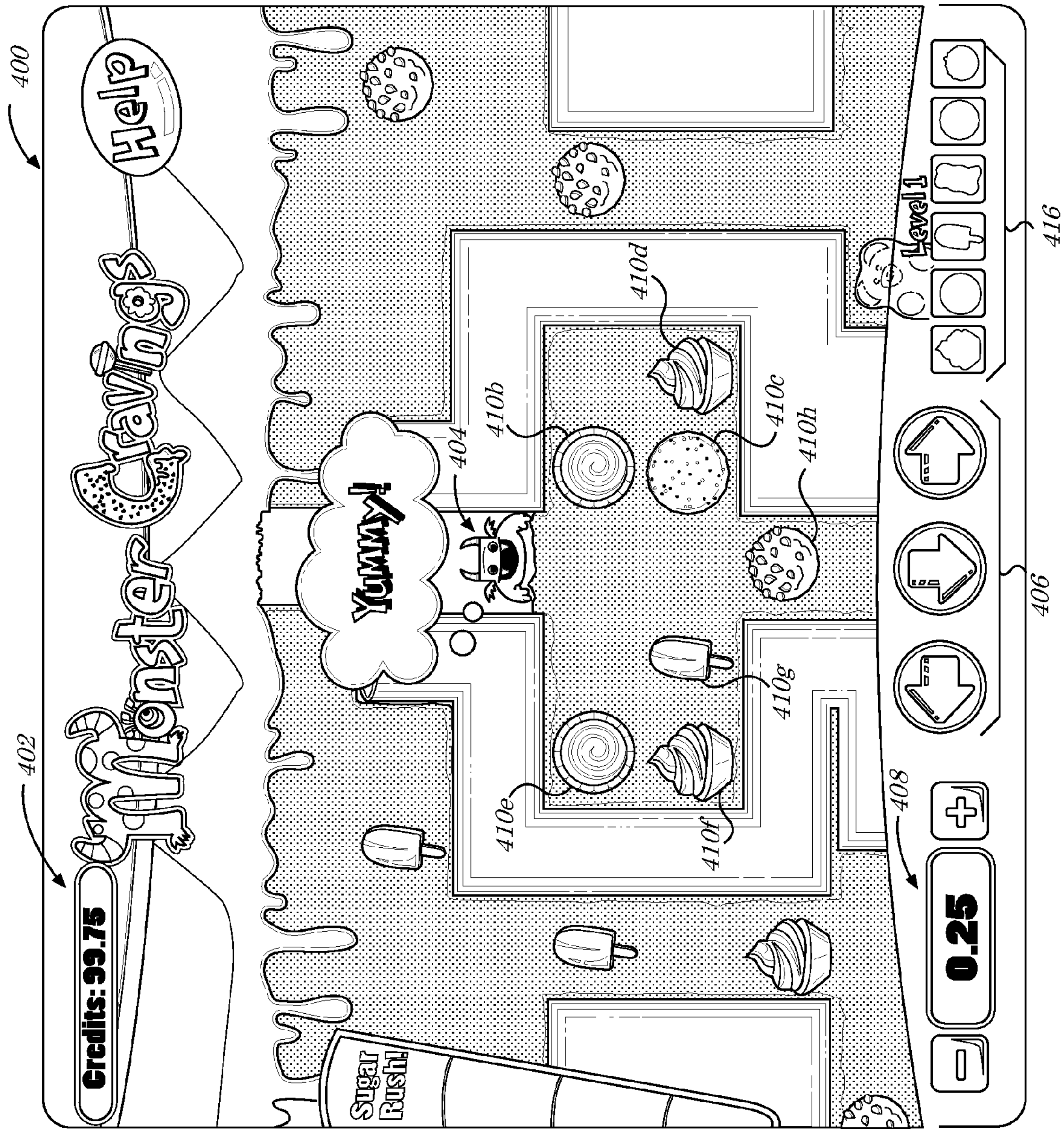

Turning now to FIG. 4C, illustrated therein is the game interface 400 as it has been modified to reflect the progress in the game since that shown in FIG. 4A. As can be appreciated by comparing the screen shot of FIG. 4A to that of FIG. 4C, the game element 404 has been moved down (presumably using the down arrow in area 406 of the screen if the game element is being controlled by the player), to the game symbol 410*a*, which represents a wagering opportunity. In accordance with some embodiments, moving a game element into an area of the game interface occupied by a game symbol which represents a wagering opportunity causes the wagering opportunity to be activated (or, in one embodiment, a request to activate the wagering opportunity to be transmitted to a game server 110). As described, in some embodiments activation of a wagering opportunity may cause a wager amount to be deducted from a credit balance and a result for the wagering opportunity to be determined. Area 408 of FIG. 4C illustrates that the current wager is 0.25 credits and area 402 illustrates that the 0.25 credits has been deducted from the credit balance, which is now at 99.75 credits rather than 100.00 credits. Since the credit balance 402 only reflects a decrease of 0.25 credits (the wager amount) and no increase, it may be understood that the wagering opportunity represented by game symbol 410*a* did not result in a win of a payout of credits to the player. Since the bonus mode eligibility meter 412 has not been modified to reflect an increase in value, it may further be understood that the non-winning wager opportunity did not result in an increase to the value of the bonus mode eligibility meter in accordance with some embodiments. Area 416 of game interface 400 has further been updated to reflect that one of the collectible symbols, the cookie game symbol 410*a*, has been collected as a result of the activation of the wagering opportunity.

Figure 4D:
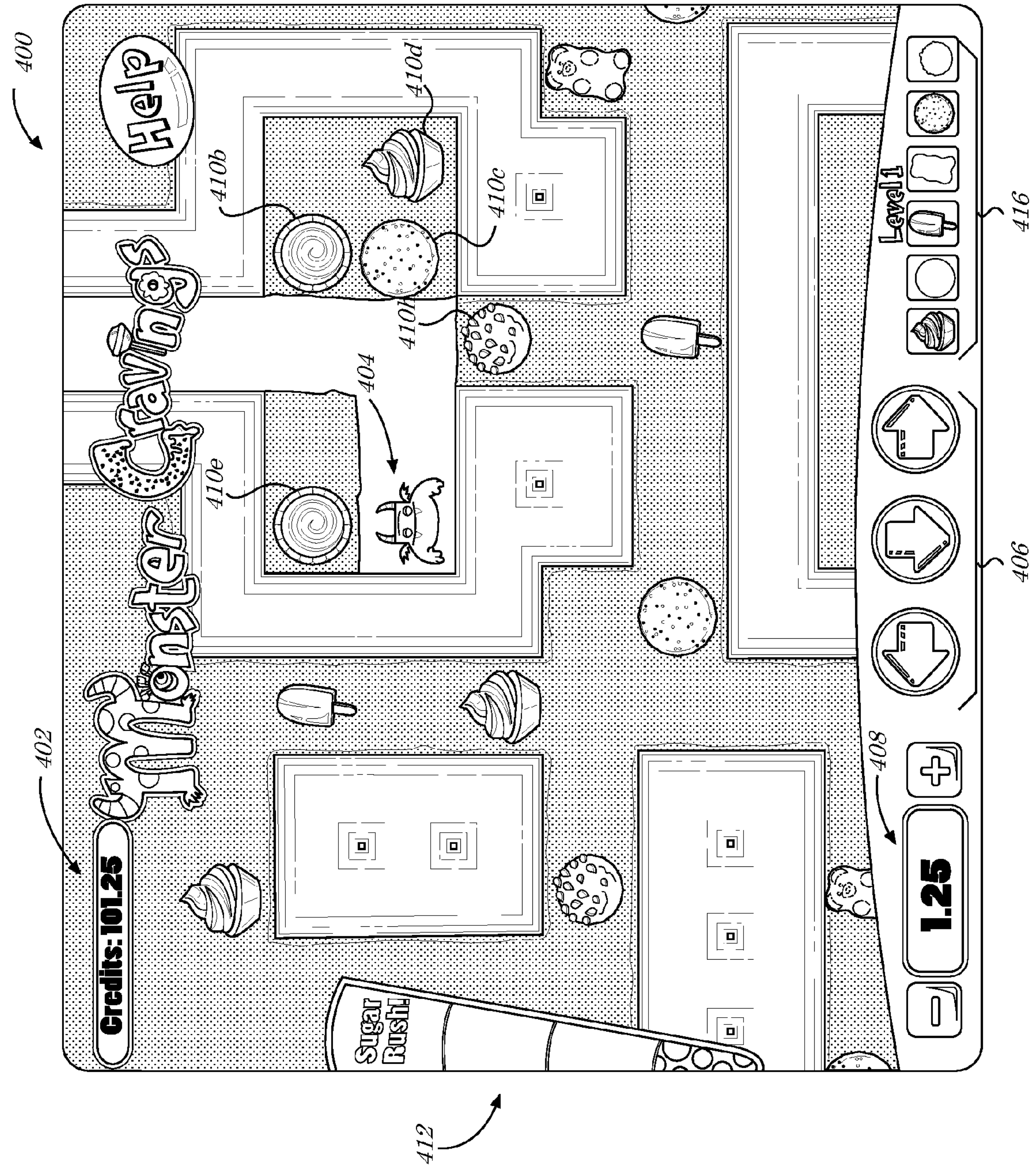

Turning now to FIG. 4D, illustrated therein is the game interface 400 as it has been modified to reflect the progress in the game since that shown in FIG. 4C. As can be appreciated by comparing the screen shot of FIG. 4C to that of FIG. 4D, the game element 404 has been moved to activate the wagering opportunities represented by game symbols 410*g* and 410*f*, respectively. The wager for the wagering opportunity represented by game symbol 410*g* was 0.25 while the wager for the game symbol represented by symbol 410*f* was 1.25, as shown in area 408 (it may be assumed that the wagering opportunity represented by symbol 410*f* was a high value wagering opportunity and thus corresponded to a higher wager, in accordance with some embodiments). This has resulted in a deduction of a total of 1.50 credits from the credit meter balance shown in area 402. However, one of these activated wagering opportunities has resulted in a prize of 3.0 credits being added to the player's credit meter balance, thus resulting in a current credit balance of 101.25 credits. Also illustrated in FIG. 4D is that the bonus mode eligibility meter 412 has been increased to the first available level as a result of the winning wagering opportunity. Area 416 of game interface 400 has further been updated to reflect that two more of the collectible symbols, the cupcake game symbol 410*f* and the popsicle game symbol 410*g*, have been collected as a result of the activation of these wagering opportunities.

As can be appreciated, based on the movement path of the game element 404, the wagering opportunities represented by game symbols 410*e* and 410*b* have effectively been foregone, since the game element 404 cannot be moved up from a current position in accordance with the movement restrictions of the example game being illustrated.

Figure 4E:
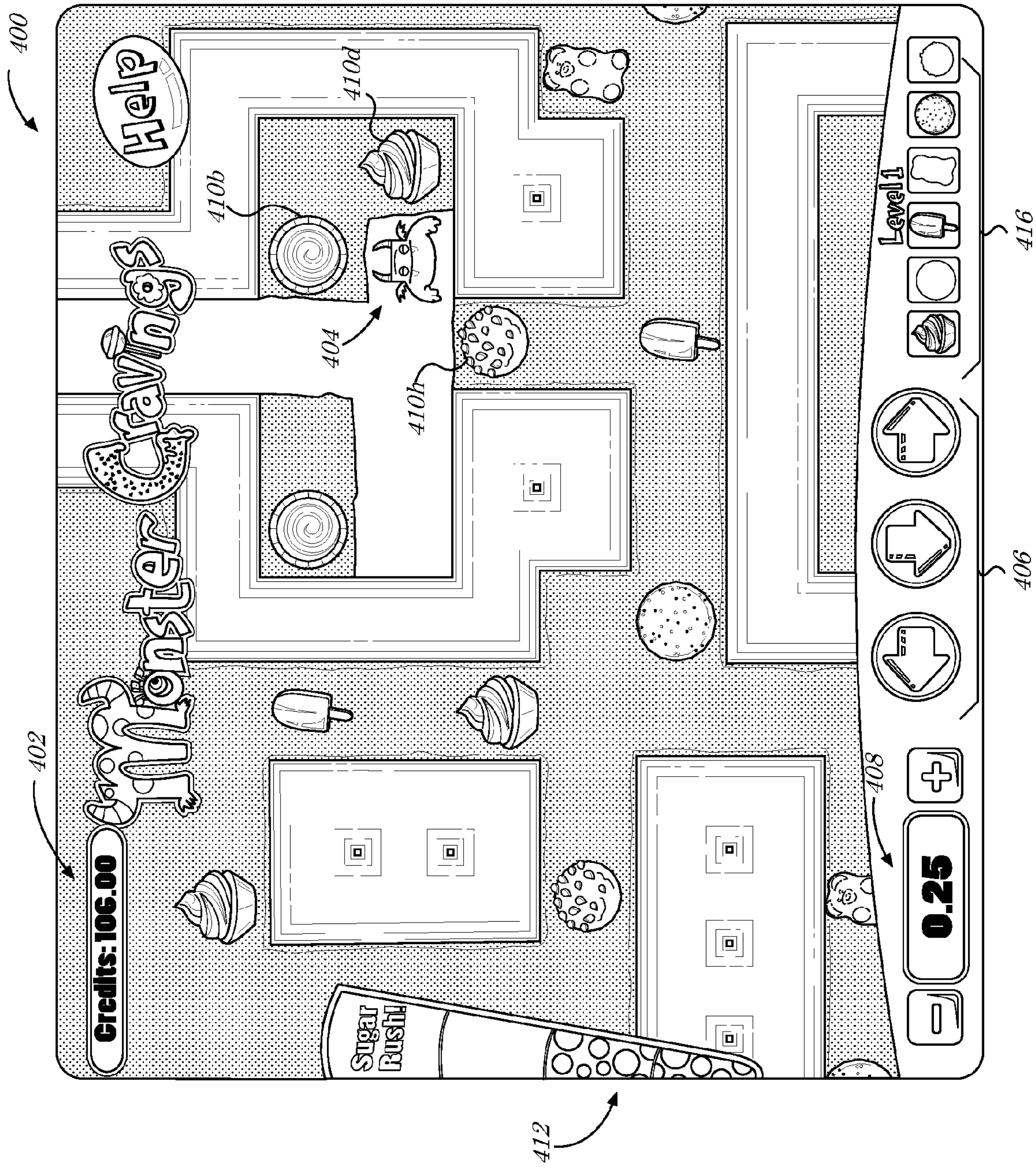

Turning now to FIG. 4E, illustrated therein is the game interface 400 as it has been modified to reflect the progress in the game since that shown in FIG. 4D. As can be appreciated by comparing the screen shot of FIG. 4D to that of FIG. 4E, the game element 404 has been moved to the right to activate the wagering opportunity represented by game symbol 410*c*, which caused a deduction of 0.25 credits for the corresponding wager from the credit balance 402. A result determined for wagering opportunity 410*c* is a win of 5 credits, which were added to the credit balance (thus the credit balance is currently 106.00 credits as illustrated in area 402). This second winning wagering opportunity also caused the bonus mode eligibility meter 412 to be increased to the second mark. Area 416 of game interface 400 has not been further modified since FIG. 4D, since no additional collectible game symbol has been collected as a result of the wagering opportunity activated in FIG. 4E (the game symbol 410*c* was the same type of game symbol as game symbol 410*a* and in the present embodiment one of each different type of game symbol must be collected in order to successfully finish the collection).

Figure 4F:
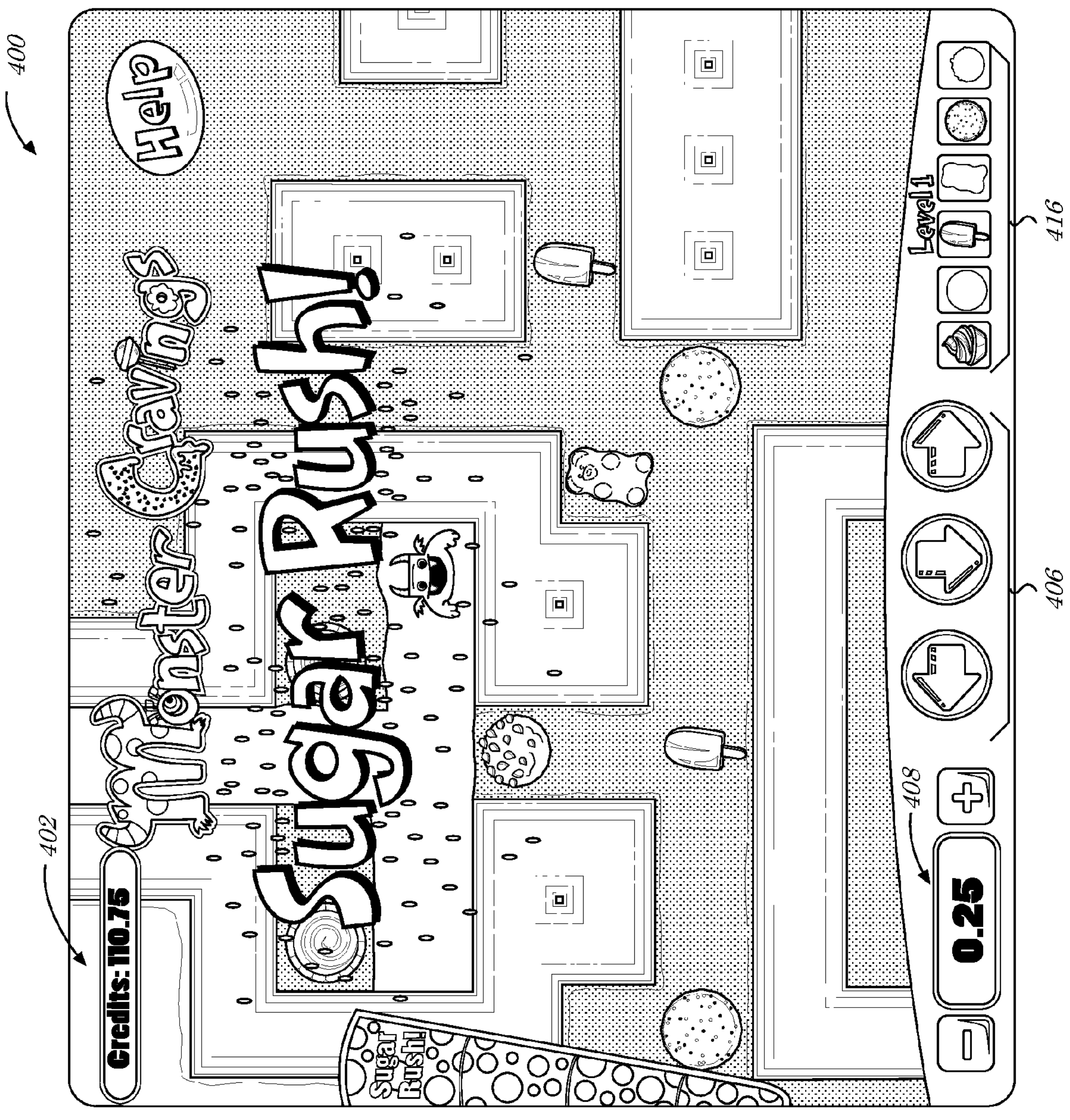

Turning now to FIG. 4F, illustrated therein is the game interface 400 as it has been modified to reflect the progress in the game since that shown in FIG. 4E. As can be appreciated by comparing the screen shot of FIG. 4E to that of FIG. 4F, the game element 404 has been moved further to the right to activate the wagering opportunity represented by game symbol 410*d*. As a result of the activation of this wagering opportunity the player has won 5 credits. As another result of this activation, a Sugar Rush bonus mode has been triggered. In the illustrative example of FIG. 4F, the selection of the wagering opportunity represented by game symbol 410*d* has caused a deduction of 0.25 credits from the credit balance 402 (the wager amount for the wagering opportunity 410*d*) as well as an addition of the 5 credits to the credit balance, resulting in a current credit balance of 106.75 credits (as shown in area 402). The wagering opportunity represented by game symbol 410*d* was, in the illustrative and non-limiting example, a high value wagering opportunity in the sense that it counted towards a double increase of the bonus mode eligibility meter 412, thus causing the bonus mode eligibility meter 412 to become filled to the top and the bonus mode to be triggered.

As described above, in some embodiments a bonus mode may cause (i) a game element to be moved automatically on behalf of the player while the bonus mode is active (e.g., until the bonus mode eligibility meter 412 is emptied or at a predetermined value, such as zero), and (ii) no wagers to be deducted from the credit balance 402 for any of the wagering opportunities activated on behalf of the player. This is the embodiment illustrated in FIG. 4F: the game element 4F is moved automatically on behalf of the player during the Sugar Rush bonus mode and no wagers are deducted for activated wagering opportunities. As described herein, various methodologies or algorithms may be used to select a path for the game element during a bonus mode in which the game element is moved automatically for the player. In one example methodology, the game element may be moved from a current position to the next closest wagering opportunity. In another example methodology, the game element may be moved such as to optimize the number of high value wagering opportunities being activated. In one embodiment, data associated with the player for whom the game character is being moved may impact the methodology used. For example, data stored in a player profile (e.g., value of the player to the gaming entity, whether the player is a frequent player, an average wager of the player and/or game play history of the player, preferences of the player) may be utilized to select among different available methodologies for moving the game element on behalf of the player. For example, a first methodology A which optimizes the path towards meeting a first goal may be selected based on a first player profile or other criteria while a second methodology B which optimizes the path towards meeting a second goal may be selected based on a second player profile or other criteria.

Figure 4G:
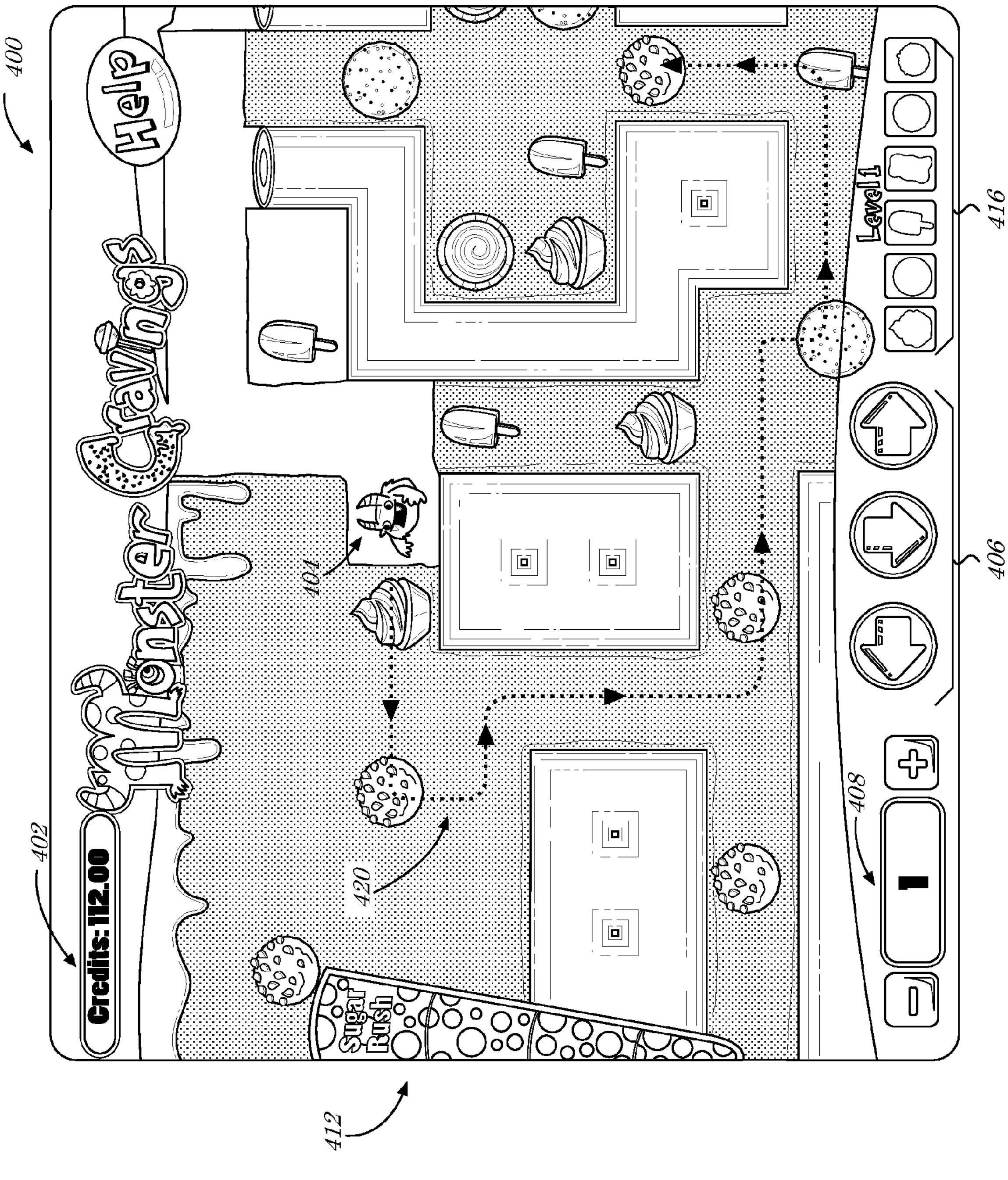

Turning now to FIG. 4G, illustrated therein is an embodiments of game interface 400 which illustrates that in some embodiments a path which selects a plurality of particular wagering opportunities may be defined for the game element 404 by the player playing the game, and the game character may then follow the path defined by the player (as opposed to the player moving the game character one move at a time, such as from one wagering opportunity to another one move at a time using the arrows in area 406 of the screen). Such embodiments in which a player predefines a path (illustrated via the dotted line 420 in FIG. 4G) which encompasses a plurality of wagering opportunities may be particularly desirable in some gaming environments, such as when a player is playing the game on a mobile gaming device (e.g., a smart phone or tablet) and it is desirable to minimize the number of inputs the player is required to provide to select wagering opportunities or move the game character. For example, a player playing the game on a device comprising a touchscreen may use his finger to "draw" the path for the game character to follow, the path defining a plurality of specific wagering opportunities selected by the player (of course, a player playing the game on such a device may also draw the path using a touchscreen or other mechanism one move at a time, such as to the next selected wagering opportunity). The game element 404 may thus go from wagering opportunity to wagering opportunity along the path and in the order indicated by the player. In some embodiments, certain advantages or benefits may be provided to the player if the player defines a path comprising one or more qualifying characteristics. For example, a player may be rewarded for a path which selects at least a minimum number of wagering opportunities. Examples of advantages or benefits which may so be provided to a player include, without limitation, decreased wagers per wagering opportunity, a more favorable pay table being used to determine a prize for a winning wagering opportunity, a more favorable probability table being used to determine whether a selected wagering opportunity is a winning wagering opportunity and/or higher likelihoods for the bonus mode to be triggered.

In summary, as illustrated in the example embodiments of FIGS. 4A through 4G, Applicants have invented a game in which representations (e.g., in the form of game symbols which may be collected for additional benefits, in a secondary aspect of the game available in some embodiments) of wagering opportunities are provided to a player on an interface (e.g., on a map of a virtual place, world or environment). Activation or selection by a player of a wagering opportunity (e.g., by moving a game element into an area occupied by a game symbol representing the wagering opportunity) causes a random or pseudo-random number to be determined for the wagering opportunity. In accordance with some embodiments, the wager may comprise a wager of real currency while in other embodiments the wager may comprise a wager of virtual currency or real currency. In some embodiments a player may be allowed to select or modify a wager amount for a particular wagering opportunity while in other embodiments a predetermined wager amount (or a predetermined minimum wager amount) may be associated with a particular wagering opportunity). In accordance with some embodiments, a player may select a wagering opportunity by moving a game element within the game environment (e.g., along available paths or areas provided in the game environment). Activation or selection of a wagering opportunity may, in some embodiments, comprise selection of a game symbol, other icon or any type of visual, graphical or audio representation of the wagering opportunity, such as by moving a game element into an area of the game interface occupied or represented by the icon, visual, graphical or audio representation.

In accordance with some embodiments, the game may have certain rules restricting certain movements (e.g., directions) for the game element. For example, the rules for a game may allow the player to move the game element left, right or down but not up or diagonally. Thus, the player may need to make certain decisions as to which wagering opportunities to pursue and which ones to bypass (e.g., if the player is not allowed to move the game element up, the player may not be able to go back to a wagering opportunity he/she bypasses by moving towards another, lower, wagering opportunity).

Figure 5:
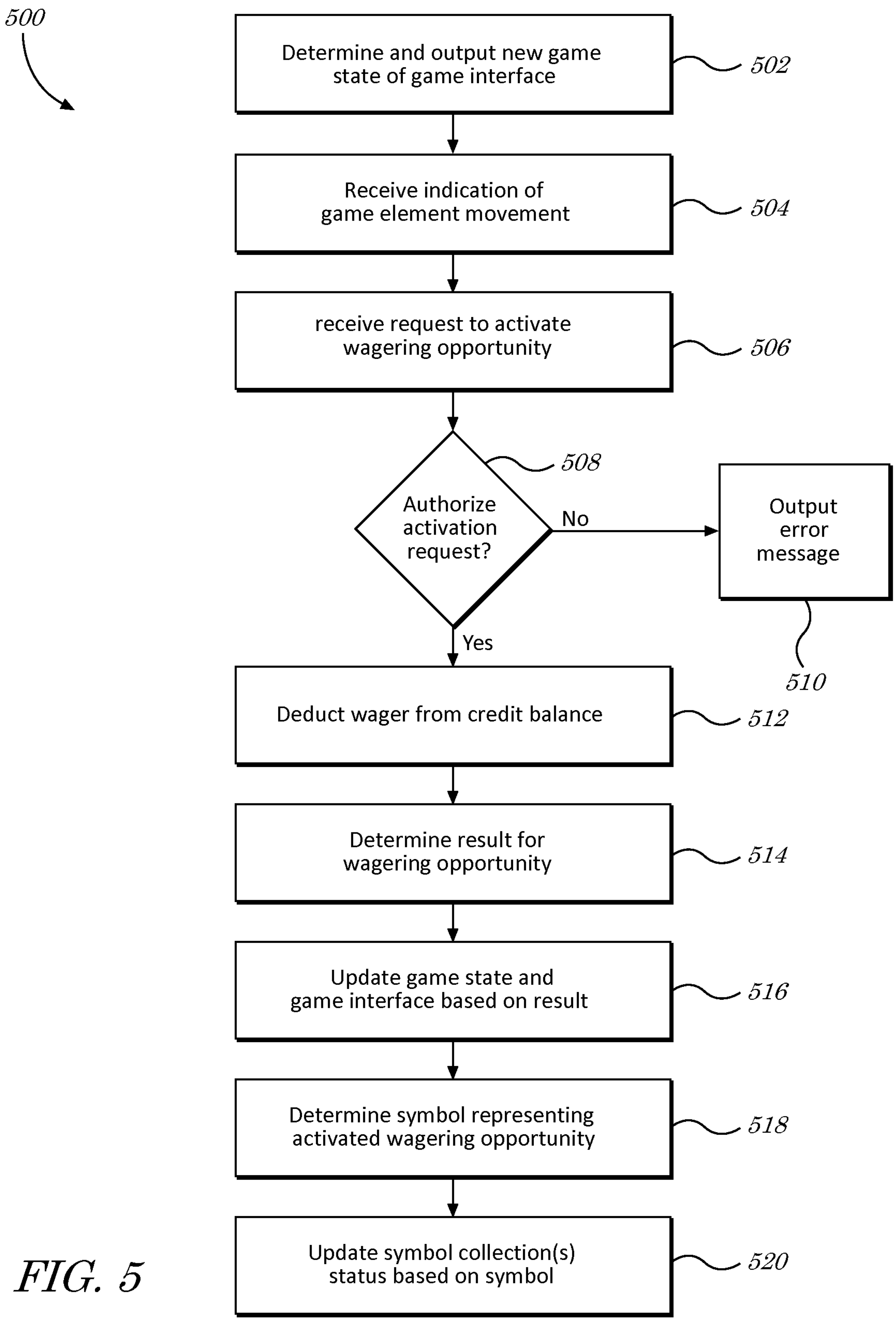
FIG. 5 is a flowchart of an example process consistent with one or more embodiments described herein.

Turning now to FIG. 5, illustrated therein is an example process 500 which is consistent with at least some embodiments described herein. Process 500 may be performed, for example, by at least one server device operable to facilitate one or more game mechanics described herein (e.g., game server 110). Process 500 may, for example, comprise a process performed by a game server to facilitate a game such as that illustrated in FIGS. 4A-4G. The process 500 comprises a process performed when a new game instance is initiated by a player (e.g., a player begins to play the game or restarts the game). In some embodiments, process 500 may be performed by a combination of a server device and a player device. In some embodiments, process 500 may be a component of a larger program. In some embodiments, process 500 may include additional or different steps, or omit certain steps, than that illustrated in FIG. 5.

The process 500 begins with the determination and output of a new game state for the game interface of the game (step 502). A new game state may comprise an initial configuration of the game interface at the beginning or restarting of the game (e.g., placement of a game element at a beginning position of the game, placement of obstacles, wagering opportunities or other components of the game interface). In some embodiments, determining a new game state may comprise retrieving a previously generated new game state (e.g., a configuration of where components of the game are placed in the game interface at the beginning or restarting of the game). In accordance with some embodiments, a different new game state or initial configuration of a game interface is presented to each player or each time a player resets or restarts the game. In other embodiments, one or more new game state configurations may be reused for more than one game (e.g., the system may store and use a plurality of available templates to use as new game states).

In accordance with some embodiments, generating a new game state or initial game interface configuration for a game may comprise determining at least one of the following: (i) placement of wagering opportunities in general (e.g., how many and where symbols representing wagering opportunities should be placed, which may include determining whether a first wagering opportunity should be placed "behind" a second wagering opportunity such that a player may need to activate the second wagering opportunity in order to gain access to or qualify to access the first wagering opportunity); (ii) determining placement of different types of wagering opportunities or wagering opportunities having certain characteristics, which may include determining how many of each type of wagering opportunity is to be place in a particular initial game state; and (iii) determining placement of one or more obstacles (e.g., which have to be moved around, removed or opened by a game element). With respect to item (ii), it should be noted that in some embodiments a wagering opportunity having a characteristic of a first type may be more valuable than a wagering opportunity having a characteristic of a second type and an algorithm, table or other instruction may be used to determine how many wagering opportunities of each type of characteristic should be placed in an initial game state for a game (e.g., in order to achieve or approach a desired probability or expected value for the game). Similarly, in some embodiments a collection mechanism may be implemented which provides for a player to collect symbols (which symbols represent available wagering opportunities) in order to qualify for a benefit (e.g., a monetary prize, multiplier, advancement, qualification for an additional level, "world" or game interface, etc.). In such embodiments, generating a new game state or initial game interface may comprise determining how many of each type of collectable symbol to place in the game interface and where to place such symbols. For example, placement of a particular collectable symbol representing a first wagering opportunity behind another symbol or second wagering opportunity may result in the player having to activate the second wagering opportunity in order to qualify for activating the first wagering opportunity, which may influence a player's strategy as to which direction to move a game element or which wagering opportunity to activate and which to leave unactivated. In some embodiments, determining an new game state or initial game interface configuration for a game may include additional selections, such as a theme, background, game character to be the movable game element, etc. Any of the foregoing determinations or selections may, in some embodiments, be based at least in part on the player for whom the new game state or initial game interface is being determined (e.g., a player's preference may guide selection of a game character, a player's prior achievement may guide selection of the level, type or number of collectable symbols, theme or obstacles selected, etc.).

In some embodiments, placement of wagering opportunities and/or obstacles in a new game state or initial game interface configuration for a game may be pseudo random. In some embodiments it may include using some predesigned patterns or sequences (e.g., "set pieces" which are put able to be put together in different ways or combined with pseudo random additional placements to create unique or considerably different configurations). In accordance with some embodiments, the pseudo random placement of wagering opportunities may be done with the goal or rule of making certain symbols and/or wagering opportunities rarer than others in a new game state or initial game interface configuration (e.g., in order to achieve or approach one or more goals, such as making completion of a collection of a predetermined number of a certain symbol easy or difficult, as may be desired). For example, if it is desired to make it more difficult (or less desirable to an average player, or more expensive in terms of wagers) to collect a certain symbols, that symbol when representing a wagering opportunity may be placed such that a plurality of other wagering opportunities may first need to be activated in order to collect the symbol. As described herein, in some embodiments collecting a symbol may comprise moving a game element into a space or area of the game interface occupied by the symbol (which may, in some embodiments, cause an activation of a wagering opportunity represented by the symbol). In some but not all embodiments a symbol that is rare may represent a more valuable wagering opportunity.

Thus, in some embodiments step 502 may comprise generating a new game state or initial game interface configuration in accordance with the considerations described above. In other embodiments, step 502 may comprise retrieving and outputting a new game state or initial game interface configuration from a memory, one that has previously been generated in accordance with the considerations described above.

In step 504, an indication of a game element movement is received (or otherwise determined, such as by periodic or non-periodic polling or pinging of the game element location). The game element movement may be effectuated by a player or (e.g., during a bonus round) by a processor which automatically moves the game element in accordance with one or more rules or guidelines. In some embodiments each time a game element moves from one area or space in a game interface to another, the player device is operable to transmit an indication of the movement or an indication of the new location of the game element resulting from the movement to a game server or other device performing process 500. In some embodiments, a game interface may map to certain areas or spaces which may be uniquely identified (e.g., as in a grid-like pattern consisting of a plurality of rows and columns, such that each intersection of a row and column may comprise a space into which a game element may move and which may be uniquely identified by providing an identifier of the column and row of the intersection or space). In some embodiments, although such areas or spaces of the game interface may be uniquely identifiable to a game server or other device via one or more coordinates or other identifiers, such coordinates or identifiers may not be visible or discernable to a player of the game (e.g., the grid-like patterns are not made visible on the game interface as viewable by the player). In some embodiments, if a game element moves into an area or space that does not correspond to a wagering opportunity (i.e., no wagering opportunity may be activated as a result of the movement), an indication of the movement may not be sent or received. In some embodiments, software stored locally on a player device may cause the player device to recognize and transmit an indication of movement of a game element (e.g., for each movement of the game element or for each qualifying movement, such as each movement which causes a wagering opportunity to be activated or requested to be activated).

In some embodiments, the current position of the game element may be stored (e.g., in a memory device of the game server 110) or utilized based on the received indication of the game element movement. In some embodiments, a device (e.g., game server 110) may track a game element's last position in the game interface and calculate the game element's current position based on the indications of game element movement passed to it by the player device on which the game is being played (or based on detecting the movements of the game element within the game interface proactively, such as by monitoring or polling the game interface for game element movement).

In step 506, a request to activate a wagering opportunity is received. In one embodiment, triggering a request to activate a wagering opportunity in a game may comprise moving a game element into an area of the game interface occupied by a game symbol representing the wagering opportunity. Thus, in some embodiments receiving a request to activate a wagering opportunity may comprise determining that the game element has moved into the area or space occupied by the game symbol representing the wagering opportunity. The determination of this movement (or determination that the current position of the game element is the position of the symbol) may be determined to be a request to activate a wagering opportunity. In some embodiments, a request to activate a wagering opportunity may comprise an instruction or signal comprising a request to activate a wagering opportunity (e.g., received from a player device). In one embodiment, each wagering opportunity placed in a game interface may be associated with a unique identifier and receiving a request to activate a wagering opportunity may comprise receiving an indication of the unique identifier of the wagering opportunity.

In one embodiment, a database or other memory device may store an indication of each wagering opportunity (including the unique identifier of each) placed in a game interface when it was first generated (e.g., when the new game state or initial configuration of the game interface was first generated), along with additional information corresponding to each such wagering opportunity (e.g., location of the wagering opportunity in the game interface, wager amount associated with the wagering opportunity, game symbol representing the wagering opportunity, one or more pre-requisites which must be satisfied in order to activate the wagering opportunity or another characteristic associated with the wagering opportunity). Thus, in one embodiment receiving an identifier of a wagering opportunity may allow a determination of other characteristics of the wagering opportunity by accessing such a database or other memory device.

In some embodiments, software stored locally on a player device may cause the player device to recognize that a game element has moved into an area of the game interface which triggers a request to activate a wagering opportunity and transmit an indication of the request (e.g., along with an indication of the movement of the game element) to another device (e.g., a game server 110). In one embodiment, the received request to activate a wagering opportunity is not accompanied by an indication of the current position of the game element. Rather, the device receiving the request to activate a wagering opportunity (e.g., game server 110) may be operable to track or store the last position of a game element and calculate the current position based on the indications of movements of the game element transmitted to it by the player device when a request to activate a wager is transmitted. In some embodiments it may be desirable to determine the particular wagering opportunity out of the plurality of wagering opportunities available in the game interface for which the request to activate is received (e.g., in embodiments in which wagering opportunities are represented by collectible game symbols, so that it may be determined whether a collection of game symbols should be updated based on the request to activate the wagering opportunity). In other embodiments, it may not be necessary or desirable to identify which wagering opportunity of the plurality of wagering opportunities in a game interface triggered the request for activation (e.g., the current position of the game element). In such embodiments, the current position of the game element may not be received or determined upon receiving the request to activate a wagering opportunity.

In some embodiments, a request to activate a wagering opportunity may include additional information, such as the wager amount corresponding to the wagering opportunity. In some embodiments, the wager amount for each wagering opportunity in a game interface may be the same. In other embodiments, a player may be able to select a wager amount for a wagering opportunity he is requesting to activate. In still other embodiments, different wagering opportunities may correspond to different wager amounts (e.g., a first wagering opportunity, which may be a higher value wagering opportunity, may correspond to a first wager amount while a second wagering opportunity, which may be a lower value wagering opportunity, may correspond to a second wager amount which is less than the first wager amount). As described herein, in some embodiments different game symbols may represent different types of wagering opportunities or wagering opportunities having different characteristic, such as wager amount. Thus, in some embodiments receiving a request to activate a wagering opportunity may comprise receiving an indication of at least one of (i) the symbol representing the wagering opportunity, (ii) the type of symbol representing the wagering opportunity; and (iii) a characteristic associated with the symbol representing the wagering or a characteristic of the wagering opportunity. It should be noted, however, that not all embodiments involve a symbol representing a wagering opportunity.

Once a request to activate a wagering opportunity is received (which request in some embodiments may comprise a simple call to the game server 110 for a result or random number to use to determine the result of the wagering opportunity), a determination of whether to authorize the activation request is performed (step 508). While this step may not be necessary or preferred in all embodiments (e.g., in some embodiments there are no pre-requisites or conditions which must be satisfied in order for a wagering opportunity to be authorized), in some embodiments it may be necessary or desirable to determine whether the wagering opportunity request should be authorized. Thus, step 508 may comprise verifying whether one or more pre-requisites for activating the wagering opportunity are satisfied. For example, in one embodiment a wagering opportunity request may only be authorized if the player has sufficient credits in his credit meter balance to place the wager amount corresponding to the wagering opportunity for which the activation request is being received. In another example, in one embodiment a first wagering opportunity which is placed behind at least one second wagering opportunity in a game interface may only be authorized if it is determined that the at least one second wagering opportunity has previously been activated. In embodiments in which a request to activate a wagering opportunity includes an identifier of the wagering opportunity, step 508 may comprise accessing a database or other memory device to determine the one or more pre-requisites which may be associated with the wagering opportunity.

If it is determined that the request for the wagering opportunity cannot be authorized, the process 500 continues to step 510 and an error message is output to the player via the player device on which the game is being played. The error message may include an indication of why the request to activate the wagering opportunity is being denied. If, on the other hand, the request to activate the wagering opportunity is to be authorized, the process 500 continues to step 512. In step 512 the appropriate wager amount corresponding to the wagering opportunity is deducted from a credit balance associated with the game or player playing the game. In one embodiment, this may comprise updating a value of a credit meter balance stored in a local memory of the device performing process 500 and/or instructing the player device (if different from the device performing process 500) to update a credit meter balance stored locally in a memory of the player device. In some embodiments, if a game character is automatically being moved on behalf of a player while in a bonus round mode, one or more of the wagering opportunities may be "free" in the sense that no wager is placed for an authorized activated wagering opportunity. In such embodiments, step 512 may be omitted from the process.

In step 514, a result for the authorized wagering opportunity is determined. This may comprise, for example, requesting a random number from an RNG and using the random number to determine a result. In some embodiments, a determination of a result may be based on at least one characteristic associated with the authorized wagering opportunity (e.g., in addition to the random number determined upon activation of the wagering opportunity). A characteristic of a wagering opportunity may comprise at least one of the following: (i) a probability table; (ii) a payout schedule; (iii) a wager amount; and (iv) a symbol or type of symbol representing the wagering opportunity. In one embodiment, a determination of a result may be based on at least one of (i) a characteristic of a player and (ii) a characteristic of a game. For example, a first probability table may be used to determine a result for a player with a higher average wager history while a second probability table may be used to determine a result for a player with a lower average wager history. In another example, a first probability table may be used if the game has not resulted in a winning result within the last X results (e.g., a probability table which increases the chances that the current wagering opportunity will have a winning result) while a second probability table may be used if the game has resulted in a winning result with the last X results.

In one embodiment, a result may be determined based on a characteristic or type of the wagering opportunity and/or the symbol representing the wagering opportunity. For example, certain wagering opportunities may be considered to have "higher value" than others, meaning they may have a higher probability of resulting in a win of a prize, result in a higher or more valuable prize or a combination thereof. Such higher value wagering opportunities may, in some embodiments, be represented with certain game symbols which a player who becomes familiar with the game comes to recognize as being symbols representing better, more valuable and/or more frequent prizes.

In some embodiments, determining a result for a wagering opportunity may comprise determining the type of wagering opportunity and or a characteristic of the wagering opportunity (e.g., the wager amount of the wagering opportunity). The type or characteristic of the wagering opportunity may be determined, for example, based on information received in or with the request to activate the wagering opportunity (in step 506). For example, at least one of an identifier, location or game symbol representing the wagering opportunity may be received in or with the request, or determined from other information associated with the request. This information may, in turn, be used to determine the type or characteristic of the wagering opportunity. For example, the game server 110 or other device performing process 500 may store a map of the game interface for the game being played, including the locations of all wagering opportunities and what type of wagering opportunity each placed wagering opportunity comprises. Thus, when the game server 110 or other device receives the request to activate a wagering opportunity, it may determine from the identifier and/or location of the wagering opportunity the type of wagering opportunity the request is for. In some embodiments, the type of wagering opportunity or other characteristic may be transmitted from the player device along with the request to activate the wagering opportunity.

Of course, not all embodiments include different types of wagering opportunities and in some embodiments all wagering opportunities may be resolved using the same probability table or payout schedule (or a probability table or payout schedule may be selected randomly or based on factors other than a type of wagering opportunity). The discussion below of how a type of the wagering opportunity may be used to determine a result for the wagering opportunity is provided for illustrative purposes only of some embodiments.

In one embodiment, different types of wagering opportunities may correspond to different payout amounts which are determined based on the RNG output obtained, received or determined for use in determining a result for the wagering opportunity (e.g., different types of wagering opportunities may correspond to different payout amounts for the same respective RNG output). For example, a table such as the following Table 1 may be used to determine a payout for a wagering opportunity based on whether the wagering opportunity authorized for activation is determined to be of Type X, Type Y or Type Z. In Table 1 below (i) X is the relatively lowest value type of wagering opportunity; (ii) Y is relatively middle value type of wagering opportunity; (iii) Z is highest value type of wagering opportunity; and (iv) RNG Outputs A, B and C are different ranges of numbers which may be output by RNG (which ranges may be of equal or different magnitudes). Payout Amount may be the exact payout to be provided for the type of wagering opportunity or an average or mean payout amount. As can be appreciated from a review of the data in Table 1, certain types of wagering opportunities may differ in payout amount and/or volatility.

TABLE 1

| Wagering Opportunity Type | Payout Amount for RNG Output A | Payout Amount for RNG Output B | Payout Amount for RNG Output C |
|---|---|---|---|
| X | 0 | 10 credits | 20 credits |
| Y | 0 | 20 credits | 30 credits |
| Z | 10 credits | 20 credits | 50 credits |

It should be noted that although the payout amounts are indicated as credits in Table 1 (and other tables provided herein), any kind of value or currency may be used for payouts. For example, a payout may be indicated in terms of U.S. cents and dollars, British pence and pounds or Japanese yen.

In one embodiment, different types of wagering opportunities (which may be represented by different game symbols) may differ in volatility if not in average payout (e.g., different types of wagering opportunities may correspond to different payout amounts for the same respective RNG output but the average payout amount may be the same among the different types of wagering opportunities). For example, in one embodiment a table such as the following Table 2 may be used to determine a payout for a wagering opportunity based on whether the wagering opportunity authorized for activation is determined to be of Type X, Type Y or Type Z. In Table 2, as in Table 1, the RNG outputs A-J may be either specific numbers or ranges of numbers (which ranges may be of the same or differing magnitudes) which may be output by an RNG.

As can be appreciated upon a review of the data in Table 2, the average payout amount for the different types of wagering opportunities remains the same (or may be similar if not the same in some embodiments) but the relative volatility (e.g., magnitude of payout and frequency of payout) differs among the different types of wagering opportunities. For purposes of the present example, it may be assumed that the wager placed for each type of wagering opportunity is the same (e.g., 20 credits). This is for purposes of simplicity; in other embodiments different wager amounts may be placed on a given type of wagering opportunity or for different types of wagering opportunities and the wager amount may be taken into account when determining a result (e.g., payout) for a given wagering opportunity.

TABLE 2

| | Wagering Opportunity Type X | Wagering Opportunity Type Y | Wagering Opportunity Type Z |
|---|---|---|---|
| Payout Amount for Output A | 0 | 0 | 0 |
| Payout Amount for Output B | 0 | 0 | 0 |
| Payout Amount for Output C | 0 | 0 | 0 |

TABLE 2-continued

| | Wagering Opportunity Type X | Wagering Opportunity Type Y | Wagering Opportunity Type Z |
|---|---|---|---|
| Payout Amount for Output D | 0 | 0 | 0 |
| Payout Amount for Output E | 0 | 0 | 0 |
| Payout Amount for Output F | 10 credits | 0 | 0 |
| Payout Amount for Output G | 20 credits | 0 | 0 |
| Payout Amount for Output H | 30 credits | 50 credits | 0 |
| Payout Amount for Output I | 40 credits | 50 credits | 0 |
| Payout Amount for Output J | 50 credits | 50 credits | 150 credits |
| Avg. Payout Amount | 15 credits | 15 credits | 15 credits |

In embodiments in which a particular game symbol(s) is used to represent wagering opportunities of a first type that are less volatile (e.g., results in smaller but more reliable payouts) while a second different game symbol(s) is used to represent wagering opportunities of a second type that are relatively more volatile (e.g., result in larger but more frequent payouts), a player who becomes more familiar with the game may come to recognize which game symbols represent which type of wagering opportunity and may adjust his play strategy accordingly (e.g., a player who prefers higher volatility in his play may try to activate more of the higher volatility wagering opportunities). For example, in a "sweets" themed game such as that illustrated in FIGS. 4A through 4F, a sour sweets or hot sweet game symbol may be used to represent wagering opportunities which are relatively more volatile.

In some embodiments, the payout amount may vary between different types of wagering opportunities but the fact that a wagering opportunity is of a first type or a second type (e.g., is associated with a first volatility vs. a second volatility) may be hidden from the player. For example, there may be no graphical or other player discernable connection between the type of wagering opportunity (or volatility or value of the wagering opportunity) and the game symbol representing the wagering opportunity.

In some embodiments, both volatility and average payout may vary between different types of wagering opportunities (e.g., different types of wagering opportunities may correspond to different payout amounts and different volatilities for the same respective RNG output). For example, a table such as the following Table 3 may be used to determine a payout for a wagering opportunity based on whether the wagering opportunity authorized for activation is determined to be of Type X, Type Y or Type Z. In Table 3, as in Table 1 and Table 2, the RNG outputs A-J may be either specific numbers or ranges of numbers (which ranges may be of the same or differing magnitudes) which may be output by an RNG.

As can be appreciated upon a review of the data in Table 3, both the volatility and the average payout amount for the different types of wagering opportunities may vary in some embodiments. For purposes of the present example, it may be assumed that the wager placed for each type of wagering opportunity is the same (e.g., 20 credits).

TABLE 3

| | Wagering Opportunity Type X | Wagering Opportunity Type Y | Wagering Opportunity Type Z |
|---|---|---|---|
| Payout Amount for Output A | 0 | 50 credits | 0 |
| Payout Amount for Output B | 0 | 50 credits | 0 |
| Payout Amount for Output C | 0 | 50 credits | 0 |
| Payout Amount for Output D | 0 | 50 credits | 0 |
| Payout Amount for Output E | 0 | 50 credits | 0 |
| Payout Amount for Output F | 10 credits | 50 credits | 0 |
| Payout Amount for Output G | 20 credits | 50 credits | 0 |
| Payout Amount for Output H | 30 credits | 50 credits | 0 |
| Payout Amount for Output I | 40 credits | 50 credits | 0 |
| Payout Amount for Output J | 50 credits | 50 credits | 1500 credits |
| Avg. Payout Amount | 15 credits | 50 credits | 1500 credits |

In some embodiments, different types of wagering opportunities may correspond to different payout amounts for the same respective RNG output, as illustrated in Table 1, Table 2 and Table 3 above, but the wager amount may differ such that a higher wager is required in order to activate a relatively "high value" wagering opportunity. As described herein, a "high value" wagering opportunity may comprise an opportunity which corresponds to some relatively higher value for the player (whether perceived or actual value), such as higher maximum payout, higher probability of winning one or more payouts or obtaining an advantage in the game. For example, in embodiments in which wagering opportunities are represented by collectible game symbols (such that when a collection of a predetermined number of a collectible game symbol is completed, the player qualifies for a prize or obtains an advantage in the game), the wagering opportunities represented by the more valuable game symbols may be considered to be high value wagering opportunities. A first game symbol may be considered to be more valuable than a second game symbol if, for example, the successful collection of the first symbol qualifies the player for a more valuable prize than does the successful collection of the second symbol. Examples of prizes which may be qualified for by a successful completion of a collection of a particular symbol include, without limitation, a monetary prize, an addition of credits to a credit meter balance, entry into a bonus round, a multiplier to be applied to one or more payouts won, a number of free spins, entry into another level of the game, increased speed of movement for a game element, another advantage in the game, etc.

For example, assume symbol A is a collectible symbol and if the player collects ten (10) of these symbols (e.g., by activating wagering opportunities represented by these symbols) the player qualifies to enter a "bonus round" mode which lasts for at least a plurality of activations of wagering opportunities, in which activation of wagering opportunities is free or for a reduced wager amount. Assume further for purposes of this example that another game symbol, symbol B, is also a collectible symbol but that collection of ten (10) of these symbols results in one free activation of a wagering opportunity. In such an example embodiment, the symbol A may be considered to be of higher value than symbol B and thus wagering opportunities represented by symbol A may be considered high value wagering opportunities as compared to wagering opportunities represented by symbol B. Irrespective of the reasons for certain types of wagering opportunities being considered high value (or even irrespective of whether the difference between wagering opportunities is a difference in value, whether perceived or actual), in some embodiments different types of wagering opportunities may correspond to different wager amounts.

A table such as the following Table 4 may be used to determine a payout for a wagering opportunity based on whether the wagering opportunity authorized for activation is determined to be of Type X, Type Y or Type Z.

TABLE 4

| | Wagering Opportunity Type X (30 credit wager) | Wagering Opportunity Type Y (60 credit wager) | Wagering Opportunity Type Z (180 credit wager) |
|---|---|---|---|
| Payout Amount for Output A | 10 credits | 50 credits | 0 |
| Payout Amount for Output B | 10 credits | 50 credits | 0 |
| Payout Amount for Output C | 10 credits | 50 credits | 0 |
| Payout Amount for Output D | 10 credits | 50 credits | 0 |
| Payout Amount for Output E | 10 credits | 50 credits | 0 |
| Payout Amount for Output F | 10 credits | 50 credits | 0 |
| Payout Amount for Output G | 20 credits | 50 credits | 0 |
| Payout Amount for Output H | 30 credits | 50 credits | 0 |
| Payout Amount for Output I | 40 credits | 50 credits | 0 |
| Payout Amount for Output J | 100 credits | 50 credits | 1500 credits |
| Avg. Payout Amount | 25 credits | 50 credits | 150 credits |

In embodiments in which a high value wagering opportunity is discernable to a player as such (e.g., because it is represented by a game symbol the player recognizes or should recognize as corresponding to a relatively more valuable benefit), a player may change his play strategy based on the placement of such high value wagering opportunities. For example, if high value wagering opportunities are placed further along in a game interface (such that the player has to activate a plurality of wagering opportunities prior to getting to the area of the game interface which include the high value wagering opportunities), the player may conserve his credit meter balance by minimizing the number of lower value wagering opportunities he activates (or omit certain ones) prior to moving the game element into this area. In another example, a player may select a direction of movement for a game element in order to get closer or qualify to activate the high value wagering opportunities.

In accordance with some embodiments, a game provider may choose to have results (e.g., payouts) of wagering opportunities determined based on a combination of the factors described herein. For example, in one embodiment a first type of wagering opportunity (e.g., represented by a "golden sweet" game symbol in the sweets-themed game illustrated in FIGS. 4A through 4G) may correspond to a relatively larger wager amount and a relatively high maximum payout amount which will be awarded infrequently (and, e.g., an opportunity to complete the "golden sweets" collection of symbols, which may correspond to an additional prize) while another type of wagering opportunity may correspond to a relatively lower wager amount, a lower maximum payout but more frequent payouts (e.g., a "chocolate sweet" in the sweets-themed game illustrated in FIGS. 4A through 4G, which may not be a collectible game symbol). Players may enjoy discovering, through play of the game, which wagering opportunities or game symbols correspond to high volatility and which don't (if this information is not output directly to the player). In some embodiments, volatility may be introduced at the game interface level, such that certain areas of the game interface are populated with wagering opportunities which correspond to a high volatility (or areas which include appreciably more of such higher volatility wagering opportunities).

Returning now to the description of process 500, step 514 may comprise determining a result for the wagering opportunity which was authorized for activation. As described, determining a result may comprise determining at least one of: (i) a payout won, if any; (ii) whether to update a status of a collection of symbols; (iii) whether or how to update a bonus round meter (e.g., whether to increase or decrease a level of the meter based on whether the wagering opportunity results in a payout); (iv) whether the player qualifies for a bonus round based on an update to the bonus round meter; and (v) whether the player has won or qualified for any other benefit based on the activation of the wagering opportunity. With respect to step (v), it should be noted that in some embodiments activation of a wagering opportunity may qualify the player for a random prize or determination of some benefit other than a payout (e.g., a prize may be awarded every 1000s wagering opportunity that is activated across the system for any active games at the time). Determining the payout may involve (i) communicating with an RNG (which may be stored or operated by a remote device or entity) to determine an RNG output (e.g., a random or pseudo-random number generated by an algorithm) for use in determining the payout; and (ii) accessing one or more probability or payout tables (such as or similar to any of the Tables 1-4 illustrated above) to determine the appropriate payout amount, if any, won as a result of the wagering opportunity. As described above, determining a result may further comprise determining a type or characteristic of a wagering opportunity, a characteristic of the player associated with the wagering opportunity and/or a characteristic of the game.

In accordance with some embodiments, a level or value of a bonus mode eligibility meter may be determined and used as a factor in determining a result of a wagering opportunity. For example, in some embodiments, different levels or values of a bonus meter may correspond to different multipliers (or other benefits) to be applied to any payout won for the wagering opportunity. In another example, different levels or values of a bonus mode eligibility meter may correspond to different payout or probability tables to use to determine a payout for the wagering opportunity (e.g., a first value of a bonus mode eligibility meter may correspond to a more volatile paytable or a paytable with a higher maximum payout while a second value of a bonus mode eligibility meter may correspond to a less volatile paytable or a paytable with a lower maximum payout). It should be noted that the term "bonus mode" and "bonus round" are used interchangeably herein.

In accordance with some embodiments, a bonus round may be triggered once a player achieves a certain predetermined number of qualifying events. A qualifying event may comprise, for example, activation of a wagering opportunity which results in a win (i.e., the player wins a prize as a result of selecting the wagering opportunity). Thus, in some embodiments, a player may qualify for a bonus or other feature of a game once the player achieves a predetermined number of winning wagering opportunities. In some embodiments, the bonus or feature may comprise activation of an "auto play" mode in which the game element is moved about the game environment or game interface in an automated fashion on behalf of the player and the player plays "for free" during this period of auto play (i.e., no wagers are deducted for any wagering opportunities which are activated during this bonus auto play mode). In some embodiments, a player may still have control over the movement of the game element during a bonus mode but the wagering opportunities may be free (or for reduced wager amounts) during the bonus mode. In some embodiments, the game element moves at an increased speed about the game environment or interface during the bonus mode.

In accordance with some embodiments, one or more multipliers may be associated with a bonus mode (e.g., a Free Spins or free activation of wagering opportunities mode), which multiplier may be applied to any wins, payouts or other prizes the player wins during the bonus mode. In one embodiment, one of a plurality of available multipliers may be applied to a payout, the multiplier being selected based on the level or value of the bonus mode eligibility meter (e.g., a Sugar Rush meter, such as meter 112) at the time a result for the wagering opportunity is being determined.

In one particular embodiment, the lower the level or value of the bonus mode eligibility meter (e.g., the less full the meter is), the higher the multiplier to be applied to any payouts won while the bonus mode eligibility meter is at that level or value. For example, when the bonus mode eligibility meter is at a relatively high value (e.g., it is almost full or full) a multiplier of one (1) or no multiplier may be applied to payouts or other prizes won while when the bonus mode eligibility meter is at this relatively high value or level. Continuing with the example, when the bonus mode eligibility meter is almost empty or at a relatively low level or value, a relatively high multiplier (e.g., five (5)) may be applied to payouts or other prizes won. In other words, the multiplier applied to prizes won may have an inverse relationship to the value or level of the bonus mode eligibility meter at the time. Applicants have recognized that by utilizing the bonus mode eligibility meter (such as the Sugar Rush meter described herein, which may be utilized during a free wagering opportunity activation bonus mode), in combination with a multiplier feature, added excitement may be created for the player even when the bonus mode eligibility meter is almost empty as the wins have a relatively greater multiplier applied to them. In a free bonus mode embodiment (where activation of wagering opportunities is authorized for no wager or a reduced wager), such a feature may encourage an intense level of anticipation as the final spins in the free spin bonus will be high stakes events. By combining the possibility of "infinite" free wagering opportunity activations with an increased award when the bonus mode is close to terminating, a wagering establishment may offer a heightened level of near miss and absolute engagement from the player even in the final moments of the bonus mode. Of course, other enhancements may be substituted for an increased multiplier at the lower levels of the bonus eligibility meter. For example, as a bonus eligibility meter becomes less full or its value otherwise decreases, a probability of one or more available prizes may increase or a likelihood of obtaining a desirable symbol (e.g., a Wild symbol) may increase.

Once the result for the wagering opportunity is determined, the process 500 continues to step 516 and the game interface is updated to reflect the result(s) determined in step 514. In some embodiments, step 516 may comprise directing a player device to so update the game interface. In some embodiments, updating the game interface may comprise at least one of the following: (i) updating the value of a credit meter balance based on a wager amount (if any) associated with the wagering opportunity (if this had not already been done earlier in the process) and a payout (if any) won as a result of the wagering opportunity; (ii) updating a value or level of a bonus round meter (e.g., increasing it if the wagering opportunity resulted in a payout awarded to the player and decreasing it if it did not, according to some embodiments); (iii) initiating a bonus mode if the result has qualified to player for the bonus mode; (iv) removing a game symbol from the game interface (e.g., the game symbol representing the wagering opportunity) and/or outputting an animation representing the activation (and, in some embodiments, result from the activation) of the wagering opportunity; (v) outputting a message to the player (e.g., congratulating the player and informing him of the payout if it is a winning result or informing the player that the wagering opportunity did not result in any payout); and (vi) otherwise updating or modifying the game interface (e.g., showing any bonuses the player may have earned via the result, revealing an additional area or level of the game interface, etc.).

As described herein, in some embodiments one or more types of game symbols used in the game may be collectible in the sense that a player may qualify for a prize or benefit upon collecting a predetermined number of the collectible symbols. In one embodiment, there may be more than one type of collectible symbol that a player may be attempting to collect while playing the game. In one embodiment, a player "collects" a game symbol by activating a wagering opportunity represented by the game symbol. For example, in the embodiment illustrated in FIGS. 4A through 4G, a player may collect a symbol by moving the monster character (game element) onto a "sweet" (game symbol) and collect the sweet when the monster character "eats" the sweet. In such embodiments, process 500 may include the additional steps 518 and 520. In some embodiments, step 518 may be part of what is done in step 514 and/or step 520 may be part of what is done in step 516. In step 518 the game symbol representing the wagering opportunity which has been activated is determined. It may further be determined whether this symbol is a symbol being collected by the player in the current game. If it is, a status of a collection of the symbol may be adjusted (in step 520). For example, the number of collected symbols for a symbol collection matching the symbol representing the wagering opportunity may be increased by one. Process 500 may then end (e.g., if the game has ended or the player has discontinued play of the game) or return to step 504, where the next movement of the game element is determined and steps 504-520 may be repeated.

V. RULES OF INTERPRETATION

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A system comprising:

a processor; and a memory storing a program for directing the processor, the processor being operable with the program to:

output via a display of a player device an interface for a wagering game, the interface comprising a plurality of areas among which a game element may move based on inputs provided via the player device, wherein at least a subset of the areas comprise wagering opportunities which are available for activation, wherein each area of the subset of the areas which comprises a wagering opportunity is occupied by a game symbol which represents the wagering opportunity, wherein a movement restriction of the wagering game prevents the game element from being moved into at least one section of interface after the game element has been moved past the at least one section, and wherein a first wagering opportunity of the wagering opportunities corresponds to a first wager amount and is of a first value to a player while a second wager opportunity of the wagering opportunities corresponds to a second wager amount that is greater than the first wager amount and is of a second value to the player, the second value being greater than the first value and the second wager amount being greater than the first wager amount;

detect, based on an input to a player device, that the game element has been moved into an area of the interface comprising one of the first wagering opportunity and the second wagering opportunity, thereby identifying a selected wagering opportunity;

activate, upon determining that the game element has been moved into the area, the selected wagering opportunity, thereby identifying an activated wagering opportunity and deducting one of the first wager amount and the second wager amount, as corresponds to the activated wagering opportunity, from a credit balance of the player;

transmit a call to a random number generator to obtain an output for the activated wagering opportunity;

determine, based on the output from the random number generator, that a result of the activated wagering opportunity is a prize to be provided to the player; and cause the prize to be provided to the player.

2. The system of claim 1, wherein determining that the game element has been moved comprises determining that the game element has been moved based on an input from the player, the input directing a movement of the game element.

3. The system of claim 1, wherein determining that the game element has been moved comprises determining that the game element has been moved automatically based on an instruction from a second processor, the input directing movement of the game element.

4. The system of claim 3, wherein the second processor is the processor.

5. The system of claim 1, wherein activating the wagering opportunity comprises determining the result of the wagering opportunity based on an output of a random number generator.

6. The system of claim 5, wherein the processor is further operable with the program to request the output from the random number generator in response to the game element moving into the area comprising the wagering opportunity.

7. The system of claim 6, wherein the processor is further operable with the program to determine the result for the wagering opportunity by retrieving from memory a previously generated result for the wagering opportunity, the previously generated result comprising a result which was determined to the game element moving into the area comprising the wagering opportunity.

8. The system of claim 6, wherein the processor is further operable with the program to:

determine a characteristic of the wagering opportunity; and wherein determining the result comprises determining the result based on both the output of the random number generator and the characteristic.

9. The system of claim 8, wherein the characteristic of the wagering opportunity comprises at least one of (i) a wager amount for the wagering opportunity; (ii) a payout table associated with the wagering opportunity; (iii) a probability table associated with the wagering opportunity; (iv) a game symbol representing the wagering opportunity; (v) a multiplier to be used in determining the result; (vi) an indication of a relative value of the wagering opportunity and (vii) an identifier associated with the wagering opportunity.

10. The system of claim 6, wherein determining a result for the wagering opportunity further comprises determining whether to update a status of a bonus mode eligibility meter based on the activation of the wagering opportunity.

11. The system of claim 10, wherein the processor is further operable with the program to:

determine that a condition for initiating a bonus mode of the game has been satisfied upon an update to the status of the bonus mode eligibility meter; and initiating the bonus mode of the game.

12. The system of claim 11, wherein initiating the bonus mode of the game comprises initiating a mode of the game in which the game element is moved by the processor among the areas of the game interface and wagering opportunities placed in the game interface are selected for activation by the processor.

13. The system of claim 11, wherein the processor is further operable with the program to facilitate the bonus mode by managing a value of the bonus mode eligibility meter during the bonus mode.

14. The system of claim 13, wherein the processor being operable with the program to manage the value of the bonus mode eligibility meter comprises the processor being operable with the program to:

increase the value of the bonus mode eligibility meter for each wagering opportunity activated during the bonus mode which results in a prize being awarded to the player; and decrease the value of the bonus mode eligibility meter for each wagering opportunity activated during the bonus mode which does not result in a prize being awarded to the player.

15. The system of claim 13, wherein the processor being operable with the program to manage the value of the bonus mode eligibility meter comprises the processor being operable with the program to:

determine a prize won as a result of a wagering opportunity activated during the bonus mode;

determine the value of the bonus mode eligibility meter at the time the prize was won;

determine a value of a multiplier to be applied to the prize; and apply a multiplier to the prize based on the value of the bonus mode eligibility meter at the time the prize was won, wherein a value of the multiplier is inversely proportional to the value of the bonus mode eligibility meter.

16. The system of claim 6, wherein determining a result for the wagering opportunity further comprises determining whether to update a status of a collection of game symbols based on the activation of the wagering opportunity.

17. The system of claim 1, wherein the processor is further operable with the program to:

receive a request to activate the wagering opportunity; and determine whether to activate the wagering opportunity by determining whether at least one prerequisite for activating the wagering opportunity has been satisfied.

18. The system of claim 17, wherein the at least one prerequisite for activating the wagering opportunity is a previous activation of at least one other wagering opportunity available in the game interface.

19. The system of claim 1, wherein the processor is further operable with the program to:

determine an initial game state for the interface.

20. The system of claim 19, wherein the processor being operable with the program to determine an initial game state for the interface comprises the processor being operable with the program to generate an initial game state based on at least one rule for generating an initial game state.

21. The system of claim 20, wherein the processor being operable with the program to generate an initial game state comprises the program being operable with the program to:

determine respective placements within the interface of a plurality of wagering opportunities.

22. The system of claim 21, wherein the processor being operable with the program to generate an initial game state comprises the program being operable with the program to:

determine a plurality of types of wagering opportunities to place in the interface; and determine a number of each type of wagering opportunity to place in the interface.

23. The system of claim 1, wherein the interface comprising a plurality of areas among which a game element may move based on inputs provided via the player device comprises a virtual world environment in which at least a subset of the areas are initially obscured from view and wherein movement of the game element into a particular area of the virtual world environment reveals at least one area of the virtual world environment that was previously obscured.

24. The system of claim 23, wherein the processor is further operable with the program to:

store a map of the virtual world;

store at least one database record that indicates a relationship between particular areas of the map and particular respective wagering opportunities; and upon detecting the selected wagering opportunity, accessing the at least one database record that corresponds to the selected wagering opportunity to retrieve associated data.

25. A method for facilitating an online game, the method comprising:

outputting, by a processor of a game server and via a display of a player device, an interface for a wagering game, the interface comprising a plurality of areas among which a game element may move based on inputs provided via the player device, wherein at least a subset of the areas comprise wagering opportunities which are available for activation, wherein each area of the subset of the areas which comprises a wagering opportunity is occupied by a game symbol which represents the wagering opportunity, wherein a movement restriction of the wagering game prevents the game element from being moved into at least one section of interface after the game element has been moved past the at least one section, and wherein a first wagering opportunity of the wagering opportunities corresponds to a first wager amount and is of a first value to a player while a second wager opportunity of the wagering opportunities corresponds to a second wager amount that is greater than the first wager amount and is of a second value to the player, the second value being greater than the first value and the second wager amount being greater than the first wager amount;

detecting, based on an input to a player device, that the game element has been moved into an area of the interface comprising one of the first wagering opportunity and the second wagering opportunity, thereby identifying a selected wagering opportunity;

activating, upon determining that the game element has been moved into the area, the selected wagering opportunity, thereby identifying an activated wagering opportunity and deducting one of the first wager amount and the second wager amount, as corresponds to the activated wagering opportunity, from a credit balance of the player;

transmitting, by the processor, a call to a random number generator to obtain an output for the activated wagering opportunity;

determining, by the processor and based on the output from the random number generator, that a result of the activated wagering opportunity is a prize to be provided to the player; and causing, by the processor, the prize to be provided to the player.

26. A non-transitory computer readable medium storing instructions executable by a processor, the instructions causing the processor to:

output via a display of a player device an interface for a wagering game, the interface comprising a plurality of areas among which a game element may move based on inputs provided via the player device, wherein at least a subset of the areas comprise wagering opportunities which are available for activation, wherein each area of the subset of the areas which comprises a wagering opportunity is occupied by a game symbol which represents the wagering opportunity, wherein a movement restriction of the wagering game prevents the game element from being moved into at least one section of interface after the game element has been moved past the at least one section, and wherein a first wagering opportunity of the wagering opportunities corresponds to a first wager amount and is of a first value to a player while a second wager opportunity of the wagering opportunities corresponds to a second wager amount that is greater than the first wager amount and is of a second value to the player, the second value being greater than the first value and the second wager amount being greater than the first wager amount;

detect, based on an input to a player device, that the game element has been moved into an area of the interface comprising one of the first wagering opportunity and the second wagering opportunity, thereby identifying a selected wagering opportunity;

activate, upon determining that the game element has been moved into the area, the selected wagering opportunity, thereby identifying an activated wagering opportunity and deducting one of the first wager amount and the second wager amount, as corresponds to the activated wagering opportunity, from a credit balance of the player;

transmit a call to a random number generator to obtain an output for the activated wagering opportunity;

determine, based on the output from the random number generator, that a result of the activated wagering opportunity is a prize to be provided to the player; and cause the prize to be provided to the player.

* * * * *